United States Patent
Inbe et al.

(10) Patent No.: US 11,293,102 B2
(45) Date of Patent: Apr. 5, 2022

(54) METHOD OF TREATING SURFACE OF METAL BASE, METALLIC MATERIAL TREATED BY THE SURFACE TREATMENT METHOD, AND METHOD OF COATING THE METALLIC MATERIAL

(75) Inventors: Toshio Inbe, Tokyo (JP); Hiroshi Kameda, Tokyo (JP); Masanobu Futsuhara, Tokyo (JP); Kazuto Akiyama, Tokyo (JP)

(73) Assignee: CHEMETALL GMBH, Frankfurt (DE)

( * ) Notice: Subject to any disclaimer, the term of this patent is extended or adjusted under 35 U.S.C. 154(b) by 1050 days.

(21) Appl. No.: 12/440,260

(22) PCT Filed: Sep. 7, 2007

(86) PCT No.: PCT/JP2007/067538
§ 371 (c)(1),
(2), (4) Date: Dec. 17, 2009

(87) PCT Pub. No.: WO2008/029926
PCT Pub. Date: Mar. 13, 2008

(65) Prior Publication Data
US 2010/0176000 A1 Jul. 15, 2010

(30) Foreign Application Priority Data
Sep. 8, 2006 (JP) .............................. JP2006-244873

(51) Int. Cl.
| | | |
|---|---|---|
| *C23C 22/34* | (2006.01) | |
| *C23C 22/83* | (2006.01) | |
| *C08L 79/02* | (2006.01) | |
| *C23C 28/00* | (2006.01) | |
| *C25D 9/10* | (2006.01) | |
| *C08G 73/02* | (2006.01) | |
| *C25D 13/02* | (2006.01) | |

(Continued)

(52) U.S. Cl.
CPC .......... *C23C 22/34* (2013.01); *C08G 73/0246* (2013.01); *C08L 79/02* (2013.01); *C09D 5/443* (2013.01); *C23C 22/83* (2013.01); *C23C 28/00* (2013.01); *C25D 9/10* (2013.01); *C25D 13/02* (2013.01); *C25D 13/22* (2013.01); *C08L 63/00* (2013.01); *C23C 2222/20* (2013.01)

(58) Field of Classification Search
CPC ....... C23C 22/34; C23C 22/361; C23C 22/82; C23C 22/83
USPC .......................................................... 148/247
See application file for complete search history.

(56) References Cited

U.S. PATENT DOCUMENTS 4,110,129 A * 8/1978 Matsushima et al. ........ 148/255
4,828,615 A * 5/1989 Cape ........................... 106/14.13
(Continued)

FOREIGN PATENT DOCUMENTS

GB       2165165   *   4/1986   ............... B05D 1/36
JP       08-134661        5/1996
(Continued)

*Primary Examiner* — Lois L Zheng
(74) *Attorney, Agent, or Firm* — Armstrong Teasdale LLP

(57) ABSTRACT

A method of treating the surface of a metal base which is conducted prior to cationic electrodeposition coating and is used for improving throwing power in the cationic electrodeposition coating; a metallic material treated by the surface treatment method; and a method of coating this metallic material.

12 Claims, 2 Drawing Sheets

(51) Int. Cl.
     *C25D 13/22*     (2006.01)
     *C09D 5/44*     (2006.01)
     *C23C 22/00*     (2006.01)
     *C08L 63/00*     (2006.01)

(56) References Cited

U.S. PATENT DOCUMENTS

| | | | |
|---|---|---|---|
| 5,294,266 A * | 3/1994 | Hauffe et al. | 148/247 |
| 6,905,590 B2 * | 6/2005 | Nojiri et al. | 205/317 |
| 7,811,366 B2 * | 10/2010 | Inbe | C09D 183/08 |
| | | | 106/14.15 |
| 2004/0144451 A1 * | 7/2004 | Matsukawa et al. | 148/247 |
| 2004/0170840 A1 * | 9/2004 | Matsukawa | C23C 22/34 |
| | | | 428/422.8 |
| 2005/0170219 A1 | 8/2005 | Penich et al. | |
| 2006/0185769 A1 | 8/2006 | Nakayama et al. | |

FOREIGN PATENT DOCUMENTS

| | | | | |
|---|---|---|---|---|
| JP | 2004-190121 | | 7/2004 | |
| JP | 2004-218072 A | | 8/2004 | |
| WO | WO 2004/055237 | * | 7/2004 | C23C 22/34 |

\* cited by examiner

METHOD OF TREATING SURFACE OF METAL BASE, METALLIC MATERIAL TREATED BY THE SURFACE TREATMENT METHOD, AND METHOD OF COATING THE METALLIC MATERIAL

This application is a § 371 of PCT/JP2007/067538 filed Sep. 7, 2007, which claims priority from JP 2006-244873 filed Sep. 8, 2006

TECHNICAL FIELD

The present invention relates to a surface treatment method which is conducted prior to cathodic electrodeposition coating, a metal material which has been treated by the surface treatment method, and a coating method for the metal material.

BACKGROUND ART

Cathodic electrodeposition coating can apply a coating film onto fine portions of metal base materials (material to be coated) with plural curves such as curves and bag portions, formed by fold-processing metal plates, and also connecting portions between metal plates. The cathodic electrodeposition coating can also form a coating film automatically and continuously, and therefore, has been widely practically applied as a method of base coating for large-size metal base materials with plural curves and bags such as car bodies in particular. The cathodic electrodeposition coating is performed by immersing a material to be coated into a cathodic electrodeposition coating composition as a negative electrode and applying a voltage thereto.

A coating film is deposited in the process of the cathodic electrodeposition coating by an electrochemical reaction so that a component in the electrodeposition coating composition moves to the surface of the material to be coated by cataphoresis and a cathodic electrodeposition coating film is deposited on the surface of the material to be coated. Since, the deposited coating film has an insulating property, electric resistance of the coating film increases as the deposition of the coating film progresses in the process of the cathodic electrodeposition coating and the thickness of the coating film increases.

As a result, the deposition of the coating film decreases at the site and the deposition of the coating film begins alternatively at undeposited sites. In this way, the coating film deposits sequentially at undeposited sites to thereby complete the electrodeposition coating film over the entire material to be coated. The property to form a continuous electrodeposition coating film by way that an insulating coating film of electrodeposition coating material is sequentially deposited at undeposited sites of a metal base material of a material to be coated is referred to as "uniformity" in this specification.

The cathodic electrodeposition coating sequentially forms an insulating coating film on the surface of a material to be coated as described above, and therefore, theoretically has an infinite uniformity and can form a uniform coating film on all portions of materials to be coated.

However, the uniformity of electrodeposition coating film tends to degrade considerably in cases where the electric resistance of the coating film does not increase for some reason even when the coating film is deposited on the surface of material to be coated. Consequently, the nonuniformity generated in film thickness significantly affects the corrosion resistance etc.

When the cathodic electrodeposition coating film is applied to metal base materials, surface treatment is typically applied in order to improve various properties such as corrosion resistance and coating adhesion. Chromic phosphate based surface treatment compositions, which have heretofore been employed for surface treatment in view of improvement in coating adhesion and corrosion resistance, have recently caused concern regarding their environmental impact due to the hazardous properties of chromium. Accordingly, zinc phosphate based surface treatment compositions have been employed as a surface treatment agent containing no chromium (e.g., see Patent Document 1).

However, the zinc phosphate based surface treatment compositions have a high metal ion content as well as a high acid content and exhibit very strong reactivity and thus are undesirable in view of economy and workability such as expensive wastewater treatment. In addition, during chemical conversion treatment of metal using zinc phosphate based surface treatment agents, water-insoluble salts are generated and separate out as a deposit inside chemical conversion treatment baths. Such a deposit is referred to as "sludge" in general and is problematic in terms of higher cost for removal and disposal of the sludge. Furthermore, phosphate ion may possibly provide an environmental load such as nutrient enrichment of rivers and oceans. Additionally, surface conditioning is necessary for surface treatment by zinc phosphate based surface treatment compositions and is problematic in production efficiency in terms of more complicated and longer processes of surface treatment.

Surface treatment compositions including metal surface treatment composition of zirconium and/or titanium compounds are publicly known as substitutes for chromic phosphate based or zinc phosphate based surface treatment compositions.

For example, Patent Document 2 discloses an aqueous surface treatment liquid for surface-treating each independently or at least two simultaneously of metal materials selected from iron materials, zinc materials, aluminum materials, and magnesium materials, in which the surface treatment liquid for metal surface is characterized in containing at least one compound selected from zirconium compounds and titanium compounds in an amount of 5 ppm to 5000 ppm as the metal element and also free fluorine ion in an amount of 0.1 ppm to 100 ppm, and has a pH of 2 to 6. In accordance with the surface treatment liquid, a surface treatment film with superior corrosion resistance after coating can be allegedly deposited on a metal surface of each independently or two to four simultaneously of iron materials zinc materials, aluminum materials, and magnesium materials using a treatment bath containing no environmental harmful component without generating the sludge, which has been impossible in the prior art.

Furthermore, Patent Document 3 discloses a pretreatment method for coating to treat a material to be coated by a chemical conversion treatment agent to form a chemical conversion film, in which the coating pretreatment method is characterized in that the chemical conversion treatment agent contains at least one selected from the group consisting of zirconium, titanium, and hafnium; and fluorine as essential components, the fluorine concentration is no higher than 10% as elemental ratio in the chemical conversion film, and at least a part of the material to be treated is an iron-based base material; and a pretreatment method for coating in which the chemical conversion film is treated at 5° C. to 100° C. by a basic aqueous solution having a pH above 9 after the treatment by the chemical conversion treatment agent in order to make the fluorine concentration in the chemical conversion film to be no higher than 10%. In accordance with the pretreatment method for coating, a chemical conversion film can be formed with superior film stability and adhesion to coating films even onto iron-based base materials to which pretreatment had been heretofore inadequate by chemical conversion treatment agents consisting of zirconium etc.

[Patent Document 1] Japanese Patent No. 2086623
[Patent Document 2] Japanese Unexamined Patent Application, First Publication No. 2004-190121
[Patent Document 3] Japanese Unexamined Patent Application, First Publication No. 2004-212072

DISCLOSURE OF THE INVENTION

Problems to be Solved by the Invention

However, in the zirconium based surface treatment composition of Patent Document 2, there is a problem in that nonuniformity of coating film arises such that, depending on the kind of metal base material, the coating film cannot be formed uniformly in the cathodic electrodeposition coating after surface treatment. There is also a problem in that uniform film can be sparingly formed in SPC steel plate, high-tensile steel plate, etc. with higher silicon contents and the corrosion resistance is inferior to those based on zinc phosphate. When the coating film cannot be formed uniformly, the effect of the electrodeposition coating cannot be obtained at the sites where the coating film is not sufficiently formed, causing degradation of corrosion resistance etc.

On the other hand, although the amount of coating film can be increased over the entire surface of metal base material by increasing the voltage, it is undesirable in view of cost. In addition, there is a problem of inferior appearance due to pinholes or craters. The reason being that spark discharge is likely to occur in hydrogen gas since discharge voltage of hydrogen gas generated on the side of the material to be coated during the cathodic electrodeposition coating, is lower in galvanized steel plate than that of iron steel plate.

Patent Document 3 discloses a treatment by the basic aqueous solution having a pH above 9, after the treatment by the chemical conversion treatment agent, however, the treatment aims to reduce the fluorine concentration in the chemical conversion film to be no higher than 10% as elemental ratio so as to solve such a problem that sufficient adhesion is unobtainable since the bond between coating films and metals is cut by action of hydroxyl group, generated when exposed to a corrosive environment after forming coating films due to remaining fluorine in chemical conversion films, and fluorine ion generated by fluorine substitution. Accordingly, the invention described in Patent Document 3 does not aim to improve uniformity at cathodic electrodeposition coating and there is no disclosure or suggestion thereof.

The present invention has been made in view of the problems described above. It is an object of the present invention to provide a metal surface treatment method for metal base material which is conducted prior to cathodic electrodeposition coating, in which the metal surface treatment method is used to improve uniformity of a cathodic electrodeposition coating film, a metal material treated with the metal surface treatment method, and a coating method for the metal material.

Means for Solving the Problems

The present inventors have encountered a problem that when zirconium based and titanium based metal surface treatment agents are used for metal base materials, a coating film cannot be uniformly formed in the subsequent cathodic electrodeposition coating film, i.e. uniformity degrades. The above problem was remarkable when used for iron-based metal base materials such as SPC steel plates. The present inventors have thoroughly investigated based on this knowledge. As a result, it has been discovered that the decrease of uniformity is derived from a main cause that film resistance of rust-resistant films is considerably lower than the film resistance of conventional zinc phosphate based films. In addition, the present inventors have discovered that the cause of the decreased uniformity is that components in rust-resistant films elute from the rust-resistant films during cathodic electrodeposition coating and the eluted components permeate into electrodeposition coating films to give an electrolytic action thereby also decreasing the film resistance of the electrodeposition coating films.

The inventors of the present invention have discovered that resistance decrease of coating film can be prevented and coating can be conducted with superior uniformity at subsequent cathodic electrodeposition coating by way of forming a rust-resistant film on a metal base material using a surface treatment composition, containing zirconium and/or titanium and an adhesive imparting agent, and post-treating under a given condition, thereby achieving the present invention. Specifically, the present invention is as follows.

In a first aspect, a metal surface treatment method, for improving uniformity of a cathodic electrodeposition coating film, includes a surface treatment step for a metal base material to surface-treat the metal base material and form a rust-resistant film using a metal surface treatment composition containing zirconium and/or titanium ions and at least one adhesive imparting agent selected from the group consisting of (A) silicon-containing compound, (B) adhesive imparting metal ion and (C) adhesive imparting resin; and a pest-treatment step selected from the group consisting of processes (a), (b), (c), (d), (e), (f) and (g), in which (a) is a process for contact treatment of all or a part of the metal base material in an alkali solution having a pH of at least 9, after the surface treatment step;

(b) is a process for contact treatment of all or a part of the metal base material in a polyvalent anion solution, after the surface treatment step;

(c) is a process for contact treatment of all or a part of the metal base material in a polyvalent anion solution and thereafter washing treatment with water, after the surface treatment step;

(d) is a process for contact treatment of all or a part of the metal base material in an oxidizing agent, after the surface treatment step;

(e) is a process for contact treatment of all or a part of the metal base material in an oxidizing agent and thereafter washing treatment with water, after the surface treatment step;

(f) is a process for contact treatment of all or a part of the metal base material in an agent for stabilizing fluorine, after the surface treatment step; and (g) is a process for contact treatment of all or a part of the metal base material in an agent for stabilizing fluorine and thereafter washing treatment with water, after the surface treatment step.

According to a second aspect, in the metal surface treatment method according to the first aspect, the alkali solution includes at least one selected from the group consisting of NaOH, KOH, ammonia, and an amine.

According to a third aspect, in the metal surface treatment method according to the first or second aspect, the polyvalent anion contained in the polyvalent anion solution is one selected from the group consisting of phosphoric acid, condensed phosphoric acid, phosphonic acid, lignin, tannic acid, phenol compound, amino acid, polyacrylic acid, and sugars.

According to a fourth aspect, in the metal surface treatment method according to any one of the first to third aspects, the oxidizing agent is one selected from the group consisting of nitric acid, nitrous acid, sulfuric acid, sulfurous acid, persulfate, phosphoric acid, hydrochloric acid, bromic acid, an iodine compound, chloric acid, hydrogen peroxide, $HMnO_4$, $HVO_3$, $H_2WO_4$, $H_2MoO_4$, and respective salt of each thereof.

According to a fifth aspect, in the metal surface treatment method according to any one of the first to fourth aspects, the agent for stabilizing fluorine is at least one selected from the group consisting of calcium, aluminum, magnesium, silicon, strontium, copper, molybdenum, boron, zirconium, titanium, and metal salts.

According to a sixth aspect, in the metal surface treatment method according to any one of the first to fifth aspects, the (A) silicon-containing compound is of at least one selected from the group consisting of silica, silicofluoride, a soluble silicate compound, silicate esters, alkyl silicates; and a silane coupling agent.

According to a seventh aspect, in the metal surface treatment method according to the sixth aspect, the silane coupling agent is at least one selected from the group consisting of aminosilane having at least one amino group in a molecule, and a hydrolysis-polycondensate of the aminosilane, where the total amount of the zirconium and/or titanium ions in the metal surface treatment composition is 10 ppm to 10000 ppm based on metal element content, the total amount of the aminosilane and/or the hydrolysis-polycondensate of the aminosilane in the metal surface treatment composition is 1 ppm to 2000 ppm based on silicon element content, and the ratio of the total amount of zirconium and/or titanium elements to the total amount of silicon element contained in the aminosilane and/or hydrolysis-polycondensate of the aminosilane is 0.5 to 500.

The term "based on metal element content" refers to the amount of a target metal element calculated by multiplying a conversion factor of the metal element (factor to convert an amount of metal compound into an amount of metal element, specifically, a value of an atomic mass of metal element of the metal compound divided by the molecular mass of the metal compound) by the amount of the metal compound. For example, the zirconium concentration based on metal element content is calculated as 44 ppm from 100×(91÷205) in the case of 100 ppm of a complex ion $ZrF_6^{2-}$ (molecular mass: 205).

Furthermore, the term "based on silicon element content" refers to the amount of target silicon metal element calculated by multiplying a conversion factor of silicon element (factor to convert an amount of silicon compound into an amount of silicon element, specifically, a value of an atomic mass of silicon element of the silicon compound divided by the molecular mass of the silicon compound) by the amount of the silicon compound. For example, the concentration based on silicon element content is calculated as 16 ppm from 100×(23÷179) in the case of 100 ppm of aminopropyltrimethoxysilane (molecular mass: 179). Furthermore, based on a concentration of 100 ppm of silicon element, the concentration of aminopropyltrimethoxysilane can be calculated as 639 ppm from 100×(28÷179).

In addition, the term "total amount" indicates a total of the entire amounts of the compounds existing in the metal surface treatment composition, including cases where any one of amounts of the compounds is zero.

According to an eighth aspect, in the metal surface treatment method according to any one of the first to seventh aspects, the (B) adhesive imparting metal ion is at least one metal ion selected from the group consisting of magnesium, zinc, calcium, aluminum, gallium, indium, copper, iron, manganese, nickel, cobalt, silver, and tin.

According to a ninth aspect, in the metal surface treatment method according to any one of the first to eighth aspects, the (C) adhesive imparting resin is at least one selected from the group consisting of a polyamine compound, a blocked isocyanate compound and a melamine resin.

According to a tenth aspect, in the metal surface treatment method according to the ninth aspect, the polyamine compound contains at least one constituent unit represented by the chemical formulas (1), (2) and/or (3) shown below, and the ratio of the total amount of the zirconium and/or titanium elements to the mass of the polyamine compound is 0.1 to 100, and in which

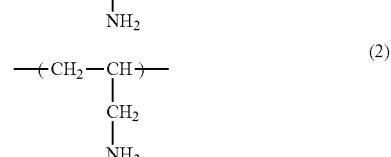

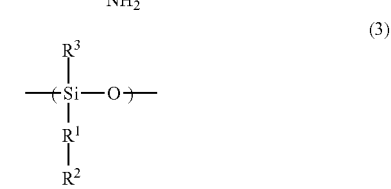

in the chemical formula (3), $R^1$ is an alkylene group having 1 to 6 carbon atoms, $R^2$ is a substituent group represented by the following chemical formulas (4) to (6) shown below, and $R^3$ is a hydroxyl group, an alkoxy group having 1 to 6 carbon atoms or an alkyl group having 1 to 6 carbon atoms, and

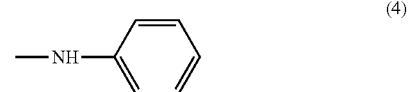

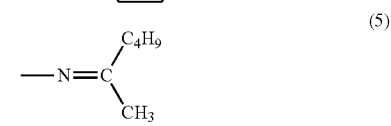

in the chemical formula (6), $R^6$ is a hydrogen atom, an aminoalkyl group having 1 to 6 carbon atoms or an alkyl group having 1 to 6 carbon atoms, and $R^7$ is a hydrogen atom or an aminoalkyl group having 1 to 6 carbon atoms.

According to an eleventh aspect, in the metal surface treatment method according to any one of the first to tenth aspects, the metal surface treatment composition has a pH of 1.5 to 6.5.

According to a twelfth aspect, in the metal surface treatment method according to any one of the first to eleventh aspects, the metal surface treatment composition further contains at least one oxidizing agent selected from the group consisting of nitric acid, nitrous acid, sulfuric acid, sulfurous acid, persulfate, phosphoric acid, hydrochloric acid, bromic acid, chloric acid, hydrogen peroxide, $HMnO_4$, $HVO_3$, $H_2WO_4$, $R_2MoO_4$, and respective salt of each thereof.

According to a thirteenth aspect, in the metal surface treatment method according to any one of the first to twelfth aspects, the metal surface treatment composition further contains at least one stabilizing agent selected from the group consisting of a hydroxy acid compound, an amino acid compound, an aminocarboxylic acid compound, an aromatic acid compound, a phosphonic acid compound, a sulfonic acid compound, and a polyvalent anion.

In a fourteenth aspect of the present invention, a metal material is obtained by treating a metal base material with the metal surface treatment method according to any one of the first to thirteenth aspects.

In a fifteenth aspect of the present invention, provided is a coating method for a metal base material in which the metal material according to the fourteenth aspect is electropainted with a cathodic electrodeposition coating material.

According to a sixteenth aspect, in the coating method according to the fifteenth aspect, the cathodic electrodeposition coating material contains a modified epoxy resin and a curing agent.

Effects of the Invention

In accordance with the present invention, alkali treatment and/or contact treatment to a polyvalent anion solution is conducted after forming the rust-resistant film in the surface treatment.

(a) Alkali-soluble substances, existing in the rust-resistant film, are removed by immersing the metal base material into the alkaline solution or applying thereof by spraying after forming the rust-resistant film, therefore, no alkali-soluble substance elutes from the rust-resistant film even under an alkaline environment near the metal base material which acts as a negative electrode during electrodeposition coating thus a decrease in the resistance values of the rust-resistant film and the coating film can be suppressed.

(b), (c) The metal base material after forming the rust-resistant film is brought into contact with the polyvalent anion solution, thereby deposition of the coating film is promoted during the electrodeposition coating and a decrease in the resistance of the coating film is suppressed.

(d) (e) The metal base material after forming the rust-resistant film is brought into contact with the oxidizing agent, thereby the surface is stabilized and a decrease in the resistance of coating film is suppressed.

(f), (g) The metal base material after forming the rust-resistant film is brought into contact with the agent for stabilizing fluorine, thereby the surface is stabilized and a decrease in the resistance of coating film is suppressed.

Consequently, the coating film can be formed uniformly over the entire surface of the metal base material during the cathodic electrodeposition coating, thereby the uniformity can be improved in the cathodic electrodeposition coating.

PREFERRED MODE FOR CARRYING OUT THE INVENTION

Figure 1:
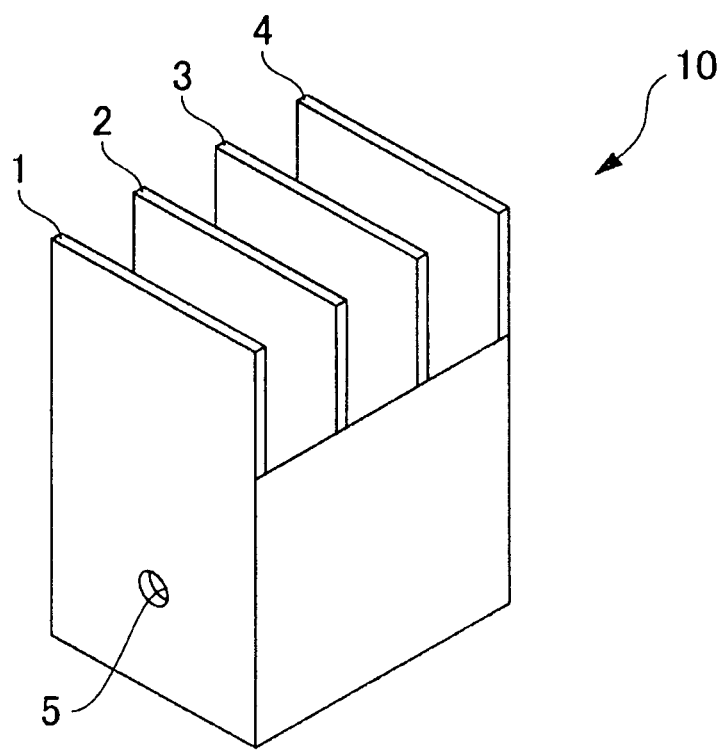
FIG. 1 is a perspective view exemplarily showing a box used when uniformity is evaluated.
Figure 2:
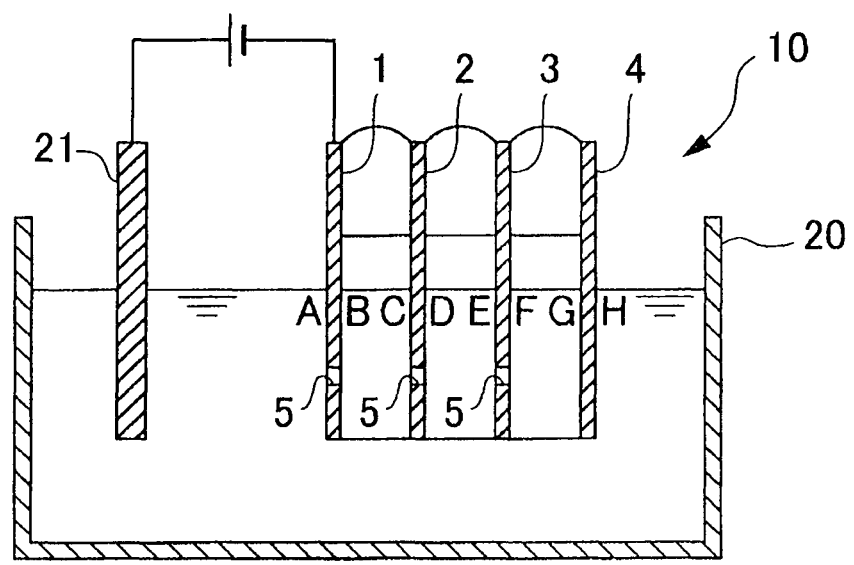
FIG. 2 is a view showing schematically the evaluation of uniformity.

Embodiments of the present invention are explained in detail below.

Surface Treatment Method

In this embodiment, the surface treatment method of treating the surface of the metal base material includes a surface treatment step in which a surface treatment composition, containing zirconium and/or titanium ions and an adhesive imparting agent, comes into contact with the metal base material to form a rust-resistant film, and an alkali treatment step in which all or a part of the metal base material after the surface treatment step is immersed into an alkali solution having a pH of at least 9 or applying thereof by spraying.

Step of Surface Treatment

In the step of surface treatment according to this embodiment, the metal surface treatment composition, containing zirconium and/or titanium ions and an adhesive imparting agent, is brought into contact with the metal base material thereby forming a rust-resistant film thereon. The method of forming a rust-resistant film is not particularly limited and can be conducted by contacting a surface treatment liquid, containing the metal surface treatment composition described later, with the metal base material. Examples of the method of forming a rust-resistant film include dipping methods, spray methods, roll coating methods, flowing treatment methods, etc.

The treatment temperature in the step of surface treatment is preferably within the range of 20° C. to 70° C., more preferably within the range of 30° C. to 50'C. A temperature below 20° C. may result in insufficient formation of the film and be undesirable in that coolers etc. are necessary to control the temperature during the summer season, and a temperature above 70° C. is not particularly effective and is no more than economically disadvantageous.

The treatment time in the step of surface treatment is preferably within the range of 2 seconds to 1100 seconds, more preferably within the range of 30 seconds to 120 seconds. A treatment time below 2 seconds is undesirable in that the film is unobtainable in a sufficient amount and a treatment time above 1100 seconds is not desirable since a greater effect is not obtainable with an increase in the amount of film.

Surface Treatment Composition

The surface treatment composition, axle to be used in the surface treatment step, is not particularly limited as long as the composition contains zirconium and/or titanium ions; and preferably, contains zirconium and/or titanium ions and the adhesive imparting agent as essential components, and an oxidizing agent, a stabilizing agent, and fluorine ion as optional components.

Zirconium and/or Titanium Ions

The zirconium and/or titanium ions, contained in the metal surface treatment composition, are a component for forming the rust-resistant film. The corrosion resistance and abrasion resistance of the metal material can be improved by forming the rust-resistant film, containing the zirconium and/or titanium elements, on the metal material.

When the surface treatment is conducted for the metal material with the metal surface treatment composition containing zirconium and/or titanium ions according to this embodiment, a dissolving reaction occurs for the metal which constitutes the metal material. When the metal-dissolving reaction occurs in the case of containing a fluoride of zirconium and/or titanium, the metal ion, which has dissolved into the metal surface treatment composition, draws out the fluorine of $ZrFe^{2-}$ and/or $TiFe^{2-}$ and the pH rises at the interface thereby generating a hydroxide or oxide of zirconium and/or titanium. And it is believed that the hydroxide or oxide of zirconium and/or titanium deposits on the surface of the metal material. The metal surface treatment composition according to this embodiment is a reactive chemical conversion treatment agent, therefore, can be used for dipping treatment of metal materials having complex shapes. Furthermore, since a rust-resistant film can be obtained that firmly adheres to the metal material through a chemical conversion reaction, water washing can be carried out after the treatment.

The zirconium compound is not particularly limited; examples thereof include fluorozirconic acid, fluorozirconates such as potassium fluorozirconate and ammonium fluorozirconate; zirconium fluoride, zirconium oxide, zirconium oxide colloid, zirconyl nitrate, zirconium carbonate, and the like.

The titanium compound is not particularly limited; examples thereof include fluorotitanic acid, fluorotitanates such as potassium fluorotitanate and armonium fluorotitanate; titanium fluoride, titanium oxide, titanium alkoxides, and the Amount of Zirconium and/or Titanium Ions The total amount of the zirconium and/or titanium ions in the metal surface treatment composition according to this embodiment is preferably within the range of 10 ppm to 10000 ppm based on metal element content, more preferably within the range of 50 ppm to 5000 ppm. When the amount is below 10 ppm, a sufficient film may be unobtainable on the metal base material, on the other hand, when the amount is above 10000 ppm, it is economically disadvantageous since no further effect can be expected.

Adhesive Imparting Agent

The adhesive imparting agent, included into the metal surface treatment composition according to this embodiment, is at least one selected from the group consisting of (A) silicon-containing compound, (B) adhesive imparting metal ion, and (C) adhesive imparting resin. The coating adhesion and the corrosion resistance after coating can be remarkably improved by including these compounds.

(A) Silicon-Containing Compound

The (A) silicon-containing compound is not particularly limited; examples thereof include silicas such as water-dispersible silica, silicofluorides such as hydrofluorosilicic acid, ammonium hexafluorosilicate, and sodium silicofluoride; water-soluble silicate compounds such as sodium silicate, potassium silicate, and lithium silicate; silicate esters; alkyl silicates such as diethyl silicate; and silane coupling agents. The amount of the silicon-containing compound in the metal surface treatment composition is preferably 1 ppm to 5000 ppm, more preferably 20 ppm to 2000 ppm. An amount of the silicon-containing compound below 1 ppm is undesirable in that the corrosion resistance of the resulting rust-resistant film degrades. An amount above 5000 ppm is economically disadvantageous since no further effect can be expected and also may possibly deteriorate the adhesion of after coating.

Silica

Silica is not particularly limited, and water-dispersible silica can be preferably used due to higher dispersibility in the metal surface treatment composition. The water-dispersible silica is not particularly limited; examples thereof include sphere-shape silica, chain-shape silica, aluminum-modified silica, etc. which contains less amount of impurities such as sodium. The sphere-shape silica is not particularly limited; examples thereof include colloidal silicas such as Snowtex N, Snowtex O, Snowtex OXS, Snowtex UP, Snowtex XS, Snowtex AK, Snowtex OUP, Snowtex C, and Snowtex OL (each trade name, manufactured by Nissan Chemical Industries, Ltd.) and fumed silicas such as Aerosol (trade name, manufactured by Japan Aerosol Co.). The chain-shape silica is not particularly limited; examples thereof include silica sols such as Snowtex PS-M, Snowtex PS-MO, and Snowtex PS-SO (each trade name, manufactured by Nissan Chemical Industries, Ltd.). The aluminum-modified silica may be commercially available silica sols such as Adelite AT-20A (trade name, manufactured by Adeca Co.). The silicon-containing compounds may be used alone, but can exhibit an excellent effect when use in combination with the (B) adhesive imparting metal ion and/or the (C) adhesive imparting resin.

Silane Coupling Agent

The silane coupling agent is particularly preferably aminosilanes having at least one amino group per one molecule. The amino silane may be any hydrolysis-polycondensate containing a monomer or dimer, and hydrolysis-polycondensate of aminosilanes is preferable since the metal material after the metal surface treatment is water-washable before the cathodic electrodeposition coating.

Aminosilane

It is believed that the aminosilanes having at least one amino group per one molecule contribute to improve the adhesion when incorporated into the rust-resistant film since they have an amino group. Specific examples of the aminosilanes having at least one amino group per one molecule include N-(2-aminoethyl)-3-aminopropyl methyldimethoxysilane, N-(2-aminoethyl)-3-aminopropyl trimethoxysilane, N-(2-aminoethyl)-3-aminopropyl triethoxysilane, 3-aminopropyl trimethoxysilane, 3-aminopropyl triethoxysilane, 3-triethoxysilyi-N-(1,3-dimethyl-butylidene)propylamine, N-phenyl-3-aminopropyl trimethoxysilane, and hydrochloride of N-(vinylbenzyl)-2-aminoethyl-3-aminopropyl trimethoxysilane. These compounds improve the corrosion resistance after coating since they are excellent in adsorbing to metal base materials and adhering to electrodeposition coating films. Commercially available silane coupling agents containing an amino group may be used such as KBM-403, KBM-602, KBM-603, KBE-603, KBM-903, KBE-903, KBE-9103, KBM-573, ICRP-90 (each trade name, manufactured by Shin-Etsu Chemical Co.) and XS1003 (trade name, manufactured by Chisso Co.).

Hydrolysis-Polycondensate of Aminosilane

The metal surface treatment composition according to this embodiment may contain a hydrolysis-polycondensate of aminosilane. The hydrolysis-polycondensate of aminosilane can improve the adhesion of both the metal base material and the coating film formed thereafter since it affects both. The molecular mass of the hydrolysis-polycondensate of aminosilane, which is not particularly limited, is preferably higher, since a higher molecular mass tends to allow easier incorporation into the hydroxide or oxide of zirconium and/or titanium. It therefore preferred that the aminosilane is allowed to react under conditions conducive for hydrolysis and polycondensation when the aminosilane undergoes the hydrolysis polycondensation reaction. The conditions conducive for hydrolysis and polycondensation are, for example, reaction conditions where the solvent is an alcohol, reaction conditions where an aminosilane is compounded to result in co-condensation rather than mono-condensation as described above, and the like. Furthermore, the hydrolysis-polycondensate can be obtained in a condition of higher molecular mass and a higher polycondensation rate by reaction under a condition of higher aminosilane concentration. Specifically, the polycondensation is preferably carried out within the range of aminosilane concentration of 5 mass to 50 mass %.

Total Amount of Aminosilane and/or Hydrolysis-Polycondensate of Aminosilane

The total amount of aminosilane and/or hydrolysis-polycondensate of aminosilane is preferably 1 ppm to 2000 ppm based on silicon element content, more preferably 10 ppm to 200 ppm. When the total amount is below 1 ppm, the adhesion is lowered, and when the total amount is above 2000 ppm, it is economically disadvantageous since no further effect can be expected.

Mass Ratio of Zirconium Element and/or Titanium Element to Silicone Element Contained in Aminosilane and/or Hydrolysis-Polycondensate of Aminosilane The mass ratio of the zirconium element and/or titanium element contained in the metal surface treatment composition to the silicone element contained in the aminosilane and/or hydrolysis-polycondensate of aminosilane is preferably 0.5 to 500. When the mass ratio is below 0.5, the adhesion and corrosion resistance degrade since the rust-resistant film is inhibited from forming from zirconium and/or titanium. When the mass ratio is above 500, adhesion cannot be sufficiently confirmed since the aminosilane and/or hydrolysis-polycondensate of aminosilane is not sufficiently incorporated into the rust-resistant film.

(B) Adhesive Imparting Metal Ion

The adhesion and corrosion resistance of the rust-resistant film can be improved by adding the (B) adhesive imparting metal ion to the metal surface treatment composition according to this embodiment. The adhesive imparting metal ion may be at least one selected from the group consisting of magnesium, zinc, calcium, aluminum, gallium, indium, copper, iron, manganese, nickel, cobalt, and silver. Among these, aluminum and tin ions are preferable since they are capable of improving the adhesion and corrosion resistance of the rust-resistant film. The amount of the adhesive imparting metal ion is preferably 1 ppm to 5000 ppm in the metal surface treatment composition, more preferably 20 ppm to 2000 ppm. An amount below 1 ppm is undesirable since the corrosion resistance may degrade in the resulting rust-resistant film. An amount above 5000 ppm is economically disadvantageous since no further effect is achieved and the post-coating adhesion may degrade. An amount below 20 ppm may result in insufficient adhesion between the rust-resistant film and the coating film, and an amount above 2000 ppm may be difficult for zirconium and/or titanium to deposit on the rust-resistant film.

Furthermore, tin ion can improve the uniformity when the cathodic electrodeposition coating is conducted after forming the rust-resistant film using the metal surface treatment composition. The mechanism to improve the uniformity is not necessarily clear, but is considered as follows.

It is considered that the tin ion is sparingly influenced by the surface condition of steel plate compared to zirconium ion and/or titanium ion, for example, and tin can deposit to form a film even on the portions where zirconium ion and/or titanium ion sparingly form the rust-resistant film, consequently, the electrodeposition coating can be carried out with superior uniformity.

The tin ion, contained in the metal surface treatment composition according to this embodiment, is preferably a divalent cation. The intended effect may be possibly unobtainable for the tin ion having a valence other than this valence. The concentration of the tin ion is preferably 0.005 to 1 versus the total amount of the zirconium ion and/or titanium ion. When the value is below 0.005, the effect of the addition may be unobtainable, and when the value is above 1, the deposition of zirconium and/or titanium may be difficult. The preferable upper and lower limits thereof are respectively 0.02 and 0.2. In this regard, the total amount of the zirconium ion and/or titanium ion and the tin ion is preferably at least 15 ppm when the tin ion is included.

In addition, the compound to supply the tin ion is not particularly limited; examples thereof include tin sulfate, tin acetate, tin fluoride, tin chloride, and tin nitrate. These compounds may be used alone or in combination of two or more.

(C) Adhesive Imparting Resin

The (C) adhesive imparting resin is at least one selected from the group consisting of a polyamine compound, a blocked isocyanate compound, and a melamine resin. The adhesion of the coating film can be significantly improved by including these compounds. The amount of the adhesive imparting resin is preferably 1 ppm to 5000 ppm in the metal surface treatment composition, more preferably 20 ppm to 2000 ppm. An amount below 1 ppm is undesirable since the corrosion resistance degrades in the resulting rust-resistant film. An amount above 5,000 ppm is economically disadvantageous since no further effect is achieved and the post-coating adhesion may degrade.

Polyamine Compound

The polyamine compound, contained in the metal surface treatment composition according to this embodiment, is a polymer compound which has plural amino groups (preferably, primary amino group) per one molecule. The polyamine compound, containing amino groups, acts on both of the rust-resistant film and the coating film formed thereafter, thus the adhesion of both can be improved. The molecular mass of the polyamine compound, which is not particularly limited, is preferably 150 to 500000, more preferably 5000 to 70000. A molecular mass below 150 is undesirable since the rust-resistant film with sufficient film adhesion is unobtainable. A molecular mass above 500000 may possibly inhibit formation of the film.

Structural Formula of Polyamine Compound

Examples of the polyamine compound include those having the structures below. That is, the polyamine compound is those having at least partially one of the structural units expressed by the chemical formulas (1), (2) and (3) below.

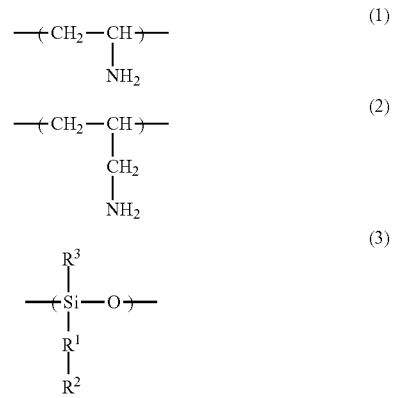

in the chemical formula (3), $R^1$ is an alkylene group having 1 to 6 carbon atoms; $R^2$ is a substituent group expressed by the chemical formulas (4) to (6); $R^3$ is a hydroxyl group, an alkoxy group having 1 to 6 carbon atoms, or an alkyl group having 1 to 6 carbon atoms.

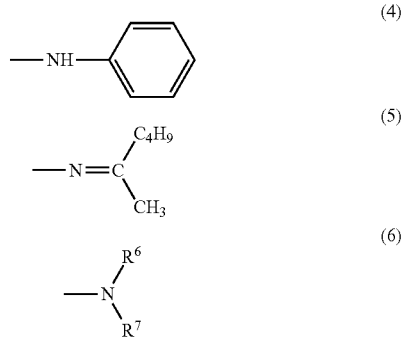

in the chemical formula (6), $R^6$ is a hydrogen atom, an aminoalkyl group having 1 to 6 carbon atoms, or an alkyl group having 1 to 6 carbon atoms; and $R^7$ is a hydrogen atom or an aminoalkyl group having 1 to 6 carbon atoms.

Preferably, the polyamine compound is a polyvinylamine resin formed only of the structural unit expressed by the chemical formula (1), a polyallylamine resin formed only of the structural unit expressed by the chemical formula (2), or a polysiloxane formed only of the structural unit expressed by the chemical formula (3), in view of the excellent effect to improve the adhesion. Examples of the polysiloxane include hydrolysis-polycondensates and salts of N-2-(aminoethyl)-3-aminopropyl methyldimethoxysilane, N-2-(aminoethyl)-3-aminopropyl trimethoxysilane, N-2-(aminoethyl)-3-aminopropyl triethoxysilane, 3-aminopropyl trimethoxysilane, 3-aminopropyl triethoxysilane, 3-triethoxysilyl-N-(1,3-dimethyl-butylidene)propylamine, N-phenyl-3-aminopropyl trimethoxysilane, and N-(vinylbenzyl)-2-aminoethyl-3-aminopropyl trimethoxysilane.

The polyvinylamine resin is not particularly limited, for example, commercially available polyvinylamine resins such as PVAM-05933 (trade name, manufactured by Mitsubishi Chemical Co.) may be used. The polyallylamine resin is not particularly limited, for example, commercially available polyallylamine resins such as PAA-01, PAA-10C, PAA-H-10C, and PAA-D-41HC1 each trade name, manufactured by Nitto Boseki Co.) may be used. The polysiloxane may also be commercially available ones. Furthermore, two or more of a polyvinylamine resin, a polyallylamine resin, and a polysiloxane may be used together.

The ratio of the mass of the zirconium element and/or titanium element to the mass of the polyamine compound is preferably 0.1 to 100, more preferably 0.5 to 20. When the mass ratio is below 0.1, sufficient adhesion and corrosion resistance are unobtainable. When the mass ratio is above 100, cracks are likely to generate in the surface treated layer and uniform films are difficult to obtain.

Blocked Isocyanate Compound

The blocked isocyanate compound is net particularly limited; examples thereof include tolylene diisocyanate isomers; aromatic diisocyanates such as 4,4'-diphenylmethane diisocyanate; aromatic-aliphatic diisocyanates such as xylylene diisocyanate; alicyclic diisocyanates such as isophorone diisocyanate and 4,4'-dicyclohexylmethane diisocyanate; and aliphatic diisocyanates such as hexamethylene diisocyanate and 2,2,4-trimethylhexamethylene diisocyanate, blocked by a blocking agent such as of phenol, alcohol, oxime, active methylene, acid amide, carbamate, and subsulfate types.

Melamine Resin

Specific examples of the melamine resin as methylether type having a methoxy group are Cymel 303, Cymel 325, Cymel 327, Cymel 350, Cymel 370, and Cymel 365 (each trade name, manufactured by Mitsui Cyanamide Co.) and Sumimal M40S, Sumimal M50S, and Sumimal M100 (each trade name, manufactured by Sumitomo Chemical Co.). Specific examples as butylether type having a butoxy group are Uban 205E6C, Uban 20SE125 and Uban 205E128 (each trade name, manufactured by Mitsui-Toatsu Chemical Co.), Super-Beckamine G521 and Super-Beckamine J820 (each trade name, manufactured by DIC Co.), and Mycoat 506 and Mycoat 508 (each trade name, manufactured by Mitsui Cyanamide Co.). Specific examples as mixed ether type are Cymel 325, Cymel 328, Cymel 254, Cymel 266, Cymel 267, Cymel 285, and Cymel 1141 (each trade name, manufactured by Mitsui Cyanamide Co.) and Nikalac MX-40 and Nikalac MX-45 (each trade name, manufactured by Mitsui Chemical Co.).

It is preferred that the (A) silicon-containing compound is used as the adhesive imparting agent and the combination of the A) silicon-containing compound and the (B) adhesive imparting metal ion is particularly preferable in view of the performance. The preferable (A) silicon-containing compound is silane coupling agents, and hydrolysis-polycondensates of aminosilanes are particularly preferable.

Furthermore, the (B) adhesive imparting metal ion, in combination with the (A) silicon-containing compound, is preferably aluminum ion and tin ion. That is, the combination of a silane coupling agent as the (A) silicon-containing compound and aluminum ion and/or tin ion as the (B) adhesive imparting metal ion is preferable as the adhesive imparting agent, and the combination of a hydrolysis-polycondensate of aminosilane as the (A) silicon-containing compound and the aluminum ion and/or tin ion as the (3) adhesive imparting metal ion is particularly preferable. Dramatically excellent film adhesion can be obtained by way that a aluminum and/or tin based film is formed even on the portions where the zirconium based rust-resistant film was not formed, by virtue of the existence of the aluminum ion and/or tin ion and also the existence of plural amino groups of hydrolysis-polycondensate of aminosilane in the film.

Oxidizing Agent

The metal surface treatment composition according to this embodiment may contain an oxidizing agent in order to promote formation of the rust-resistant film. The oxidizing agent, which the metal surface treatment composition can contain, may be at least one selected from the group consisting of nitric acid, nitrous acid, sulfuric acid, sulfurous acid, persulfate, phosphoric acid, hydrochloric acid, bromic acid, chloric acid, hydrogen peroxide, $HMnO_4$, $HVO_3$, $H_2WO_4$, $H_2MoO_4$, and salts thereof.

Stabilizing Agent

Preferably, the metal surface treatment composition according to this embodiment contains a stabilizing agent which inhibits elution of the components in the rust-resistant film during the cathodic electrodeposition coating. As described above, the film resistivity of the rust-resistant film, which is obtained by treating with zirconium and/or titanium based surface treatment compositions, is lower than those of the conventional zinc phosphate based films. Besides, when the cathodic electrodeposition coating is applied on the metal base material on which a rust-resistant film containing zirconium and/or titanium has been formed, components in the rust-resistant film elute and act as an electrolyte under alkaline conditions near the metal base material as the negative electrode. The electrolyte tends to permeate into the electrodeposition coating film, therefore, the film resistance of the electrodeposition coating film decreases thereby remarkably degrading the uniformity of the electrodeposition coating material. The stabilizing agent inhibits the elution of the components of the rust-resistant film and also adsorbs to defective portions of the rust-resistant film (exposed portions of metal base material) thereby enhancing the corrosive resistivity of the film and improving the corrosion resistance. Since the stabilizing agent further has a chelating force, for example, it stabilizes iron (II) ion and inhibits the generation of sludge such as of iron oxide, consequently bringing about a merit to prolong the lifetime of treatment baths.

In order to prevent the decrease of the film resistance of the electrodeposition coating film due to the electrolyte generation during the electrodeposition coating, the metal surface treatment composition according to this embodiment contains a stabilizing agent which can capture the eluted ions etc. to insolubilize or stabilize them. The stabilizing agent may be specifically at least one selected from the group consisting of a hydroxy acid compound, an amino acid compound, an aminocarboxylic acid compound, an aromatic acid compound, a polyvalent anion compound, a sulfonic acid compound, and a phosphonic acid compound.

In addition, the stabilizing agent may be used to prepare the surface treatment composition which can improve the uniformity during the cathodic electrodeposition coating by way of adding the stabilizing agent to conventional zirconium and/or titanium based surface treatment compositions.

Hydroxy Acid

The hydroxy acid is a collective term of carboxylic acids having a hydroxyl group together with, and occasionally is also referred to as hydroxycarboxylic acid, oxy acid, alcohol acid, etc. In this embodiment, water-soluble compounds having at least one carboxylic group and at least one hydroxyl group per one molecule can be used. Specifically, ascorbic acid, citric acid, malonic acid, gluconic acid, tartaric acid, and lactic acid can be preferably used.

Amino Acid

In addition to various natural amino acids and synthetic amino acids, synthetic amino acids having at least one amino group and at least one acid group (carboxylic group, sulfonic group, etc.) per one molecule can be broadly used as the amino acid. Among these, at least one selected from the group consisting of alanine, glycine, glutamic acid, aspartic acid, histidine, phenylalanine, asparagine, arginine, glutamine, cysteine, leucine, lysine, proline, serine, tryptophan, valine, tyrosine, and salts thereof can be preferably used. Furthermore, when optical isomers exist in the amino acid, any isomers can be used regardless of L-form, D-form, or racemic form.

Aminocarboxylic Acid

Except for the amino acids described above, compounds having both functional groups of an amino group and a carboxylic group per one molecule can be broadly used as the aminocarboxylic acid. Among these, at least one selected from the group consisting of diethylene triamine pentaacetic acid (DTFA), hydroxyethyl ethylenediamine triacetic acid (HEDTA), triethylene tetraamine hexaacetic acid (TTHA), 1,3-propanediamine tetraacetic acid (PDTA), 1,3-diamino-6-hydroxypropane tetraacetic acid (DPTA-OH), hydroxy-ethyl iminodiacetic acid (HIDA), dihydroxy ethyl glycine (DHEG), glycol ether diamine tetraacetic acid (GEDTA), dicarboxymethyl glutamic acid (GEDTA), (S,S)-ethylenediamine succinic acid (EDDS), and salts thereof can be preferably used. In addition, ethylenediamine tetraacetic acid (EDTA) and nitrilotriacetic acid (NTA) may be used but are problematic in use from the viewpoint of toxicity and lower biodegradability. Also, sodium nitrilotriacetate, which is sodium salt of NTA, is considered to be less problematic for the items described, above and thus is preferably used.

Aromatic Acid

The aromatic acid is specifically exemplified by phenol compounds having at least one phenolic hydroxyl group per one molecule. The phenol compounds are exemplified by the compounds having two or more phenolic hydroxyl groups such as catechol, gallic acid, pyrogallol and tannin acid or phenol compounds having a basic skeleton of these compounds (for example, polyphenol compounds which contain flavonoid, tannin, catechin, etc., polyvinyl phenol, water-soluble resol, novolac resins, etc.), lignin, etc. Among these, tannin, gallic acid, catechin, and pyrogallol are particularly preferable. The flavonoid is not particularly limited; examples thereof include flavone, isoflavone, flavonol, flavanone, flavanol, anthocyanidin, orlon, chalkone, epigallocatechin gallate, gallocatechin, theaflavin, daidzin, genistin, rutin and myricitrin.

Sulfonic Acid Compound

At least one selected from the group consisting of meta sulfonic acid, isechi sulfonic acid, taurine, naphthalene disulfonic acid, aminonaphthalene disulfonic acid, sulfosalicylic acid, naphthalenesulfonic acid/formaldehyde condensate, alkylnaphthalene sulfonic acid, and salts thereof can be used as the sulfonic acid.

The coating property and corrosion resistance of the metal base material after surface treatment can be improved by use of the sulfonic acid compound. The mechanism is not necessarily clear, but the following two reasons are considered.

Firstly, substances of segregated silica, etc. exist on the surface of the metal base material of steel plate etc. and thus the surface composition is nonuniform, therefore, there exist portions where etching is difficult during the surface treatment. However, it is estimated that addition of the sulfonic acid compound can achieve the etching at the portions where the etching is difficult; consequently, a uniform rust-resistant film is likely to be formed on the surface of the material to be coated. That is, it is estimated that the sulfonic acid compound acts as an etching promoting agent.

Secondly, it is believed that hydrogen gas, which can be generated by a chemical conversion reaction, may disturb an interfacial reaction during the surface treatment and the sulfonic acid compound removes the hydrogen gas by action of depolarization to promote the reaction.

Among the sulfonic acid compounds, taurine is preferable in view of having both an amino group and a sulfonic group. The amount of the sulfonic acid compound is preferably 0.1 ppm to 10000 ppm, more preferably 1 ppm to 1000 ppm. When the amount is below 0.1 ppm, the effect to add the sulfonic acid compound is insufficient, and when the amount is above 10000 ppm, the deposition of the zirconium and/or titanium may be disturbed.

Polyvalent Anion

The polyvalent anion is not particularly limited; for example, at least one selected from the group consisting of phosphoric acid, a condensed phosphoric acid, a phosphonic acid, a lignin, tannins, a phenol compound, a polyacrylic acid, and sugars can be used. Among these, the tannins are exemplified by gallotannin, ellagitannin and catechin, and the sugars are exemplified by glucose, maltose and fructose. Among the polyvalent anions described above, a condensed phosphoric acid, a polyacrylic acid, and catechin are preferably used.

Phosphonic Acid Compound

Organic phosphonic acid compounds such as 1-hydroxy ethylidene-1,1-diphosphonic acid-2-phosphobutanone-1,2,4-tricarboxylic acid, ethylenediamine tetra(methylene phosphonic acid), diethylene triamine penta(methylene phosphonic acid), and 2-phosphobutanone-1,2,4-tricarboxylic acid are preferably used as the phosphonic acid compound. The phosphonic acid compounds may be used alone or, in combination.

Amount of Stabilizing Agent

The amount of the stabilizing agent to add to the metal surface treatment composition according to this embodiment is within the range of 0.1 ppm to 10000 ppm, more preferably within the relics of 1 ppm to 1000 ppm. The concentration below 0.1 ppm of the stabilizing agent is undesirable since the effect to add the stabilizing agent is not sufficiently obtainable, and the concentration above 10000 ppm is undesirable since the rust-resistant film may be disturbed to form.

Reductive Chelating Force of Stabilizing Agent

It is preferred that the stabilizing agent has a reductive chelating force. By virtue of this reducing ability, iron (II) ion, dissolved in surface treatment baths, can be inhibited from being oxidized into iron (III) ion thereby inhibiting the generation of sludge. Furthermore, the resulting iron (III) ion can be chelated to stabilize. Consequently, the lifetime of surface treatment baths is prolonged. The stabilizing agent having the reductive chelating force is exemplified by lactic acid, ascorbic acid, citric acid, etc. These stabilizing agents may be used alone or in combination of two or more.

Fluorine Ion

The uniformity improving agent according to this embodiment may further contain a fluorine ion. The fluorine ion plays a role of an etching agent of the metal base material and a complexing agent of zirconium and/or titanium. The supply source of the fluorine ion is not particularly limited; examples thereof include fluorides such as hydrofluoric acid, ammonium fluoride, fluoroboric acid, ammonium hydrogen fluoride, sodium fluoride, and sodium hydrogen fluoride. Furthermore, complex fluorides may be the supply source, and are exemplified by hexafluorosilicates, specifically, hydrofluosilic acid, zinc hydrofluosilicate, manganese hydrofluosilicate, magnesium hydrofluosilicate, nickel hydrofluosilicate, iron hydrofluosilicate, calcium hydrofluosilicate, etc.

The pH of the metal surface treatment composition used this embodiment is preferably within the range of 1.5 to 6.5, more preferably within the range of 2.0 to 5.5, and still more preferably within the range of 2.5 to 5.0. When the pH is below 1.5, the film may not be sufficiently formed due to excessive etching or the coating appearance etc. may be deteriorated due to nonuniformity of deposited amount and film thickness of the film. On the other hand, when the pH is above 6.5, superior films are unobtainable due to insufficient etching.

In addition, the pH of the metal surface treatment composition can be adjusted using acidic compounds such as nitric acid and sulfuric acid and basic compounds such as sodium hydroxide, potassium hydroxide and ammonia.

Alkali Treatment Step

Metal ions eluted during alkaline treatment step, which are dissolved from the metal base material during formation of the rust-resistant film, are incorporated into the rust-resistant film and form alkali-soluble compounds. The method to elute the metal ions, which is not particularly limited, is exemplified by the method in which the metal base material, on which the rust-resistant film has been formed, is washed by an alkali solution. By virtue of eluting the metal ions in this way, no metal ion elute from the rust-resistant film during the cathodic electrodeposition coating, therefore, the resistance value of the rust-resistant film or coating film does not decrease and the coating film car be uniformly formed over the entire surface of the metal base material by the cathodic electrodeposition coating.

Alkali Solution

Alkali solutions containing basic compounds such as NaOH, KOH, ammonia, amines, aminosilanes, aminophenols, and polyamines can be used in the alkali treatment step. Among these, alkali solutions containing NaOH, KOH, ammonia, or amines are particularly preferable in view of higher versatility. The solvent to elute the solutes described above is preferably water, and if necessary may be aqueous solvents mixed with water-soluble organic solvents such as methanol and ethanol.

When washing is carried out using an alkali solution in the alkali treatment step, the pH of the alkali solution used for the washing is preferably at least 9, more preferably 10 to 14. A pH below 9 of the alkali solution is undesirable in that metal ions, existing in the rust-resistant film to form alkali-soluble compounds, cannot be sufficiently removed. A pH above 14 of the alkali solution is undesirable in that the rust-resistant film is dissolved. The method to bring the alkali solution into contact with the metal base material is exemplified by dipping methods, spraying methods, and sprays for outer plates of structural objects, but is not particularly limited thereto. That is, the method to contact the alkali solution and the metal base material may be any one as long as capable of sufficiently removing the metal ions from all or a part of structural objects.

The alkali treatment is conducted at a treatment temperature of 0° C. to 100° C. for a treatment time of 2 seconds to 600 seconds. When the treatment time is below 2 seconds, the effect of the alkali treatment is substantially unobtainable. A treatment time above 600 seconds does not result in a higher effect. The treatment temperature is preferably 5° C. to 60° C., more preferably 15° C. to 40° C. Furthermore, the treatment time is preferably 5 seconds to 180 seconds, more preferably 10 seconds to 60 seconds.

Contact Treatment Step to Polyvalent Anion Solution

The metal base material, which has undergone the surface treatment step, can undergo a contact step to a polyvalent anion solution in place of the alkali treatment step or along with the alkali treatment step. The contact treatment step to the polyvalent anion solution can lead to adsorption of polyvalent anions to the surface of the metal base material thereby promoting the deposition of the coating film during the cathodic electrodeposition coating. Consequently, a decrease in the resistance of the coating film can be suppressed during the cathodic electrodeposition coating, therefore, the coating film can be formed uniformly by the cathodic electrodeposition coating.

Polyvalent Anion

The polyvalent anion, able to be included in the polyvalent anion solution, is not particularly limited providing at least two anionic functional groups per one molecule are included, and preferably, is at least one selected from the group consisting of phosphoric acid, a condensed phosphoric acid, a phosphonic acid, a lignin, tannins, a phenol compound, an amino acid, a polyacrylic acid, and sugars.

Contact Treatment Step to Oxidizing Agent

The metal base material, which has undergone the surface treatment step, can undergo a contact step to an oxidizing agent place of the alkali treatment step or along with the alkali treatment step. The contact treatment step to an oxidizing agent stabilizes the basic oxidized film. Consequently, a decrease in the resistance of the coating film can be suppressed during the cathodic electrodeposition coating, therefore, the coating film can be formed uniformly by the cathodic electrodeposition coating.

Oxidizing Agent

The oxidizing agent, which is not particularly limited, is preferably nitric acid, nitrous acid, persulfate, phosphoric acid, a carboxylic group-containing compound, a sulfonic group-containing compound, hydrochloric acid, bromic acid, an iodine compound, chloric acid, hydrogen peroxide, $HMnO_4$, $HVO_3$, $H_2WO_4$, $H_2MoO_4$, or a salt thereof. These oxidizing agents may be used alone or in combination of two or more.

Contact Treatment Step to Agent for Stabilizing Fluorine

The metal base material, which has undergone the surface treatment step, can undergo a contact treatment step to an scent for stabilizing fluorine in place of the alkali treatment step or along with the alkali treatment step. The contact treatment step to an agent for stabilizing fluorine stabilizes the surface of film. Consequently, a decrease in the resistance of the coating film can be suppressed during the cathodic electrodeposition coating, therefore, the coating film can be formed uniformly by the cathodic electrodeposition coating.

Agent for Stabilizing Fluorine

The agent for stabilizing fluorine, which is not particularly limited providing a fluorine salt can be formed therewith, is preferably calcium, magnesium, silicon, strontium, copper, molybdenum, boron, zirconium, titanium, or a metal salt. These agents for stabilizing fluorine may be used alone or in combination of two or more.

Water Washing Treatment Step

The metal base material, which has undergone the contact step to a polyvalent anion solution, the contact step to an oxidizing agent, and the contact step to an agent for stabilizing fluorine, is subjected to a water washing treatment if necessary. The water washing treatment can prevent the electrodeposition coating material from being stained. The water washing treatment can be conducted by making the metal base material contact with water. The method to bring the metal base material into con-act with water is exemplified by dipping methods, spraying methods, and sprays for outer plates of structural objects, but is not particularly limited thereto. The treatment temperature during the water washing treatment is preferably 0° C. to 100° C., and the treatment time is preferably 2 seconds to 600 seconds.

The alkali treatment, the contact treatment with a polyvalent anion solution, the contact treatment with an oxidizing agent, and the contact treatment with an agent for stabilizing fluorine may be conducted alone or in combination of these treatments. That is, any one treatment followed by another treatment and combinations of three or more treatments are within the scope of the present invention. In this connection, it is preferred that the water washing treatment is conducted after the contact treatment with a polyvalent anion solution, the contact treatment with an oxidizing agent, and the contact treatment with an agent for stabilizing fluorine are conducted.

Metal Base Material

The metal base material, used in the surface treatment method according to this embodiment, is not particularly limited, and is exemplified by an iron-based metal base material, an aluminum-based metal base material, and a zinc-based metal base material.

Furthermore, the surface treatment method according to this embodiment can be applied to a combination of plural kinds of metal base materials (including connecting portions between different kinds of metals) of the iron-based metal base material, aluminum-based metal base material, zinc-based metal base material, etc. Car bodies, parts for cars, etc. are constructed from various metal base materials such as of iron, zinc, aluminum, etc.; a rust-resistant film can be formed with sufficient coverage and adhesion to the metal base material, and appropriate corrosion resistance can be provided to such car bodies and parts for cars through one treatment, in accordance with the surface treatment method of this embodiment.

The iron-based metal base material used for the metal base material according to this embodiment is not particularly limited and exemplified by cold-rolled steel, hot-rolled steel, mild steel plate, high-tensile steel plate, etc. Furthermore, the aluminum-based metal base material is not particularly limited and exemplified by 5000 series aluminum alloys, 6000 series aluminum alloys, and aluminum-plated steel plate such as of aluminum electro-plating, hot-dip plating, vapor-deposition plating, etc. Furthermore, the zinc-based metal base material is not particularly limited and exemplified by zinc or zinc-based alloy plated steel plate of electro-plating, hot-dip plating, or vapor-deposition plating steel plate such as galvanized steel plate, zinc-nickel plated steel plate, zinc-titanium plated steel plate, zinc-magnesium plated steel plate, zinc-manganese plated steel plate, etc. The high-tensile steel plate, which encompasses a wide variety of grades depending on strength or production methods, is exemplified by JSC400J, JSC440P, JSC440W, JSC590R, JSC590T, JSC590Y, JSC780T, JSC780Y, JSC980Y, JSC1180Y, etc.

Amount of Rust-Resistant Film

The film amount of the rust-resistant film in the case of the iron-based metal base material, formed by the surface treatment method according to this embodiment, is preferably at least 10 $g/m^2$ based on metal element content of zirconium and/or titanium, more preferably at least 20 $g/m^2$, and most preferably at least 30 $g/m^2$. When the film amount of the rust-resistant film is below 10 $g/m^2$, sufficient corrosion resistance is unobtainable.

Although there is particularly no upper limit as for the film amount of the rust-resistant film concerning any metal materials, excessively large film amounts tend to generate cracks in the rust-resistant film and makes it difficult to obtain a uniform film. In this regard, the film amount of the rust-resistant film, formed by the metal surface treatment method according to this embodiment, is preferably no larger than 1 $g/m^2$ based on metal element content of zirconium and/or titanium, more preferably no larger than 800 $mg/m^2$.

Metal Material

In the metal material having on the metal base material the rust-resistant film formed by the surface treatment method according to this embodiment, the alkali-soluble substances, which dissolve from the metal base material and are incorporated into the rust-resistant film during the surface treatment step and are then eluted under an alkaline environment near the metal base material which acts as a negative electrode during electrodeposition coating, such that they are removed from the rust-resistant film by the alkali treatment step. When the cathodic electrodeposition coating is carried out using such a metal material, the values of film resistance do not decrease with respect to the rust-resistant film and the coating film since the alkali-soluble substances do not elute from the rust-resistant film thus the coating film can be uniformly formed. Consequently, the uniformity can be improved.

Cathodic Electrodeposition Coating
Electrodeposition Coating Step

In the electrodeposition coating step, the cathodic electrodeposition coating is conducted by applying typically a voltage of 50 V to 450 V between a negative electrode of a material to be coated and a positive electrode. When the applied voltage is below 50 V, the electrodeposition is insufficient, and when above 450 V, the coating film is destroyed to result in an abnormal appearance. It is also preferred that the time to apply the voltage, which depends on the electrodeposition conditions, is 2 minutes to 4 minutes in general.

Following completing the electrodeposition step, the coating film, obtained in this way, is baked (heat treatment) and cured directly or after water washing. The baking conditions are preferably 120° C. to 260° C., more preferably 140° C. to 220° C. Preferably, the baking time is 10 minutes to 30 minutes.

Cathodic Electrodeposition Coating Material

The cathodic electrodeposition coating material that can be used during the cathodic electrodeposition coating, may be conventional ones without particular limitation; and conventional cathodic electrodeposition coating materials can be used that contain modified epoxy resins such as aminated epoxy resins, aminated acrylic resins and sulfoniumated epoxy resins; curing agents, and sealing agents.

The modified epoxy resin according to this embodiment is not particularly limited and may be used from conventional ones. Preferably, amine-modified epoxy resins, which are prepared by opening an epoxy ring of a bisphenol-type epoxy resin by an amine, and oxazolidone ring-containing epoxy resins are used. A typical example of bisphenol-type epoxy resin, for a raw material of the modified epoxy resins, is a bisphenol A-type or bisphenol F-type epoxy resin. Commercialized products of the former are Epicoat 826 (trade name, manufactured by Yuka-Shell Epoxy Co., epoxy equivalent: 180 to 190), Epicoat 1001 (trade name, manufactured by Yuka-Shell Epoxy Co., epoxy equivalent: 450 to 500), Epicoat 1010 (trade name, manufactured by Yuka-Shell Epoxy Co, epoxy equivalent: 3000 to 4000), etc., and commercialized products of the latter are Epicoat 807 (trade name, manufactured by Yuka-Shell Epoxy Co., epoxy equivalent: 170) etc.

The curing agent is not particularly limited and may be used from conventional ones. Preferably, a blocked isocyanate curing agent is used that is prepared by blocking a polyisocyanate by a sealing agent. Examples of the polyisocyanate include aliphatic diisocyanates such as hexamethylene diisocyanate, hexamethylene diisocyanate, tetramethylene diisocyanate and trimethylhexamethylene diisocyanate; cycloaliphatic polyisocyanates such as isophorone diisocyanate and 4,4'-methylene bis(cyclohexylisocyanate); and aromatic diisocyanates such as 4,4'-diphenylmethane diisocyanate, tolylene diisocyanate and xylylene diisocyanate.

Examples of the sealing agent include monovalent alkyl (or aromatic) alcohols such as n-butanol, n-hexyl alcohol, 2-ethyl hexanol, lauryl alcohol, phenol carbinol and methyl phenyl carbinol; cellosolves such as ethylene glycol mono-hexyl ether and ethylene glycol mono-2-ethylhexyl ether; phenols such as phenol, para-t-butylphenol and cresol; oximes such as dimethyl ketoxime, methyl ethyl ketoxime, methyl isobutyl ketoxime, methyl amyl ketoxime and cyclohexane oxime; and lactams typified by ε-caprolactam and γ-butyrolactam.

EXAMPLES

Example 1

Metal Base Material

A commercially available cold-roiled steel (SPC, manufactured by Nippon Testpanel Co., 70 mm by 150 mm by 0.8 mm) was prepared for a metal base material.

Pretreatment of Metal Base Material

Surf Cleaner EC92 (trade name, manufactured by Nippon Paint Co.) was used as an alkali degreasing treatment agent to degrease the metal material at 40° C. for 2 minutes. The material was dipped and cleaned in a water-washing bath and then spray-washed with tap water for about 30 seconds.

Preparation of a Metal Surface Treatment Composition

A metal surface treatment composition was obtained by way of adding 40% zirconic acid as 500 ppm of zirconium based on metal element content and KBE 903 (3-aminopropyl-triethoxysilane, effective concentration: 100%, trade name, manufactured by Shin-Etsu Chemical Co.) as an adhesive imparting agent in an effective component concentration of 200 ppm and adjusting to pH 4 by NaOH.

In addition, a hydrolysis-polycondensate of KBE 903 with an effective component of 5% (hereinafter referred to as "KBE 903 polycondensate A") was used as the KBE 903 described above bat was prepared by way of dropping 5 mass parts of KBE 903 from a dripping funnel into a mixed solvent (solvent temperature: 25° C.) of 45 mass parts of deionized water and 50 mass parts of ethanol constantly over 60 minutes, allowing the mixture to react at 25° C. for 24 hours under a nitrogen atmosphere, and then depressurizing the reactant solution to evaporate the ethanol.

The ratio of the amount of zirconium element to the total amount of silicon element contained in the aminosilane and/or hydrolysis-polycondensate of aminosilane (Zr/Si ratio) was 20. The surface-treated metal base material was heated and dried at 40° C. for 90 seconds.

Alkali Treatment Step

The metal base material, which had been surface-treated, was alkali-treated using a sodium hydroxide solution of pH 12. The alkali treatment was conducted at room temperature for 60 seconds.

Example 2

A surface treatment composition was prepared in the same manner as described in Example 1 and surface treatment was conducted under the same conditions as Example 1, except that zirconium was used in an amount of 250 ppm based on metal element content, KBE 603 (N-2-(aminoethyl)-3-aminopropyl-trimethoxysilane, effective concentration: 100%, trade name, manufactured by Shin-Etsu Chemical Co.) was used as the adhesive imparting agent in an effective component concentration of 200 ppm, and a colloidal silica of Snowtex O (trade name, manufactured by Nissan. Chemical Industries, Ltd.) was used in an effective component concentration of 200 ppm. The Zr/Si ratio was 10. The alkali treatment was conducted at room temperature for 60 seconds using a sodium hydroxide solution of pH 11.

In addition, in regards to the KBM 603 described above, a hydrolysis-polycondensate of KBM 603 (hereinafter referred to as "KBM 603 polycondensate") was used that was previously hydrolysis-polycondensed in the same manner as Example 1 except that the KBM 603 was used in place of the KBE 903.

Example 3

The metal surface treatment composition was prepared by way of using 700 ppm of zirconium based on metal element content, and 50 ppm of PAA-H-10C (polyallylamine resin, trade name, manufactured by Nitto Boseki Co.) and 500 ppm of zinc nitrate as adhesive imparting agents, and adjusting the pH to 3.5. A surface treatment composition was prepared in the same manner as described in Example 1 and surface treatment was conducted under the same conditions as Example 1, except for those described above. The alkali treatment was conducted at room temperature for 60 seconds using KBM 903 (trade name, manufactured by Shin-Etsu Chemical Co.) of pH 11.5.

Example 4

An organosilane hydrolysis-polycondensate, in an effective component concentration of 30% (hereinafter referred to as "KBE 903/KBE 603 co-condensate"), was obtained by way of dropping 15 mass parts of KBE 903 (trade name, manufactured by Shin-Etsu Chemical Co.) and 15 mass parts of KBE 603 (N-2-(aminoethyl)-3-aminopropyl-trimethoxysilane, trade name, manufactured by Shin-Etsu Chemical Co.) from a dripping funnel into 70 mass parts of deionized water as a solvent (solvent temperature: 25° C.) constantly over 60 minutes and then allowing to react the mixture at 25° C. for 24 hours under a nitrogen atmosphere. A surface treatment composition was prepared in the same manner as described in Example 1 and surface treatment was conducted under the same conditions as Example 1, except that zirconium was used in an amount of 700 ppm based on metal element content and a KBE 903/KBE 603 co-condensate was used in an effective component concentration of 300 ppm as an adhesive imparting agent. The Zr/Si ratio was 19. The alkali treatment was conducted at room temperature for 60 seconds using a potassium hydroxide solution of pH 12.

Example 5

A surface treatment composition was prepared in the same manner as described in Example 1 and surface treatment was conducted under the same conditions as Example 1, except that KBE 603 (trade name, manufactured by Shin-Etsu Chemical Co.) in an effective component concentration of 300 ppm and hydrofluorosilicic acid in an effective component concentration of 50 ppm were used as adhesive imparting agents. The Zr/Si ratio was 13. The alkali treatment was conducted at room temperature for 60 seconds using a triethylamine solution of pH 11.5. In addition, in regards to the KBE 603 described above, a hydrolysis-polycondensate of KBE 603 (hereinafter referred to as "KBE 603 polycondensate") was used that was previously hydrolysis-polycondensed in the same manner as Example 1 except the KBE 603 was used in place of the KBE 903.

Example 6

A surface treatment composition was prepared in the same manner as described in Example 1 and surface treatment was conducted under the same conditions as Example 1, except that zirconium was used in an amount of 250 ppm based on metal element content, PAA-H-10C (polyallylamine resin, trade name, manufactured by Nitto Boseki Co.) was used in an amount of 30 ppm as an adhesive imparting agent, and HIDA (hydroxyethyl iminodiacetic acid) was used in an amount of 200 ppm as a uniformity improving agent. The alkali treatment was conducted at room temperature for 60 seconds using a sodium hydroxide solution of pH 12.

Example 7

A surface treatment composition was prepared in the same manner as described in Example 1 and surface treatment was conducted under the same conditions as Example 1, except that zirconium was used in an amount of 250 ppm based on metal element content, KBE 903 polycondensate A was used in an effective component concentration of 150 ppm as an adhesive imparting agent, and aspartic acid was used in an amount of 100 ppm as a uniformity improving agent. The Zr/Si ratio was 13. The alkali treatment was conducted at room temperature for 60 seconds using a sodium hydroxide solution of pH 12.

Example 8

Thirty mass parts of KBE 903 (trade name, manufactured by Shin-Etsu Chemical Co.) was dropped from a dripping funnel into a mixture solvent (solvent temperature: 25° C.) of 35 mass parts of deionized water and 35 mass parts of isopropyl alcohol constantly over 60 minutes. The mixture was allowed to react at 25° C. for 24 hours under a nitrogen atmosphere. Thereafter the reactant solution was depressurized to evaporate the isopropyl alcohol thereby to obtain an organosilane hydrolysis-polycondensate (hereinafter referred to as "KBE 903 polycondensate B") in an effective component of 30%. A surface treatment composition was prepared in the same manner as described in Example 1 and surface treatment was conducted under the same conditions as Example 1, except that KBE 903 polycondensate B was used in an effective component concentration of 150 ppm as an adhesive imparting agent and citric acid was used in an amount of 50 ppm as a uniformity improving agent. The Zr/Si ratio was 43. The alkali treatment was conducted at room temperature for 60 seconds using a sodium hydroxide solution of pH 12.

Example 9

The surface treatment composition was prepared in the same manner as described in Example 1 and surface treatment was conducted under the same conditions as Example 1, except that Colloidal Silica OXS (trade name, manufactured by Nissan Chemical Industries, Ltd.) was used in an effective component concentration of 200 ppm as an adhesive imparting agent. The alkali treatment was conducted at room temperature for 20 seconds using a sodium hydroxide solution of pH 12.

Example 10

A surface treatment composition was prepared in the same manner as described in Example 1 and surface treatment was conducted under the same conditions as Example 1, except that zirconium was used in an amount of 250 ppm based on metal element content, and a KBE 903 polycondensate A in an effective component concentration of 200 ppm and magnesium nitrate in an amount of 500 ppm were used as adhesive imparting agents. The alkali treatment was conducted at 40° C. for 10 seconds using a sodium hydroxide solution of pH 12.

Example 11

The surface treatment composition was prepared in the same manner as described in Example 1 and surface treatment was conducted under the same conditions as Example 1, except that fluorozirconic acid was used as zirconium in an amount of 250 ppm based on metal element content, a modified polyallylamine was used in an amount of 50 ppm as an adhesive imparting agent, sodium nitrite was used in an amount of 100 ppm as an additive, and the pH was adjusted to 3.5. The alkali treatment was conducted at room temperature for 60 seconds using a sodium hydroxide solution of pH 12.

Here, the modified polyallylamine was synthesized by way that weight % of PAA 10C (polyallylamine, effective concentration: 10%, trade name, manufactured by Nitto Boseki Co.) and KBM 403 (3-glycidoxypropyl-trimethoxysilane, effective concentration: 100%, trade name, manufactured by Shin-Etsu Chemical Co.) were mixed in an weight ratio of 1:0.5 and allowed to react at a reaction temperature of 25° C. for a reaction time of 60 minutes.

Example 12

The surface treatment composition was prepared in the same manner as described in Example 1 and surface treatment was conducted under the same conditions as Example 1, except that zirconium was used in an amount of 700 ppm based on metal element content, and polypentamethylene biguanidine acetate (biguanide) was used in an amount of 100 ppm as an additive. The Zr/Si ratio was 28. The alkali treatment was conducted at room temperature for 60 seconds using a sodium hydroxide solution of pH 12.

Example 13

The surface treatment composition was prepared in the same manner as described in Example 1 and surface treatment was conducted under the same conditions as Example 1, except that KBE 903 polycondensate B was used in an effective component concentration of 200 ppm as an adhesive imparting agent and ascorbic acid was used in an amount of 100 ppm as an additive. The Zr/Si ratio was 27. The alkali treatment was conducted at room temperature for 60 seconds using a sodium hydroxide solution of pH 12.

Example 14

Metal Base Material

A commercially available cold-rolled steel (SPC, manufactured by Nippon Testpanel Co., 70 mm by 150 mm by 0.8 mm) was prepared for the metal base material.

Pretreatment of Metal Base Material

Surf Cleaner EC92 (trade name, manufactured by Nippon Paint Co.) was used as an alkali degreasing treatment agent to degrease the metal material at 40° C. for 2 minutes. The material was dipped and cleaned in a water-washing bath and then spray-washed with tap water for about 30 seconds.

Preparation of Metal Surface Treatment Composition

The metal surface treatment composition was prepared by way of using 40% zirconic acid as 700 ppm of zirconium based on metal element content and a KBE 903/KBE 603 co-condensate as an adhesive imparting agent in an effective component concentration of 300 ppm. The Zr/Si ratio was 19. The surface treatment was conducted at 35° C. for 60 seconds.

Contact Step with Polyvalent Anion Solution

A lignin solution of 300 ppm was brought into contact with the metal base material after surface treatment at room temperature for 30 seconds. No water washing was conducted.

Example 15

A surface treatment composition was prepared in the same manner as described in Example 14 and surface treatment was conducted under the same conditions as Example 14, except that zirconium was used in an amount of 500 ppm used on metal element content, and a KBM 603 polycondensate in an effective component concentration of 300 ppm and hydrofluorosilicic acid in an effective component concentration of 50 ppm were used as adhesive imparting agents. A phosphoric acid solution of 1000 ppm was then brought into contact with the surface treated base metal material at 40° C. for 30 seconds in the polyvalent anion solution contact step. Thereafter water washing was conducted.

Example 16

A surface treatment composition was prepared in the same manner as described in Example 14 and surface treatment was conducted under the same conditions as Example 24, except that zirconium was used in an amount of 250 ppm based on metal element content and PAA-H-10C (polyallylamine resin, trade name, manufactured by Nitto Boseki Co.) was used in an amount of 30 ppm as an adhesive imparting agent. A polyacrylic acid solution of 500 ppm was then brought into contact with the surface treated base metal material at room temperature for 20 seconds in the polyvalent anion solution contact step. No water washing was conducted.

Example 17

Metal Base Material

A commercially available cold-rolled steel (SPC, manufactured by Nippon Testpanel Co., 70 mm by 150 mm by 0.8 mm) was prepared for the metal base material.

Pretreatment of Metal Base Material

Surf Cleaner EC92 (trade name, manufactured by Nippon Paint Co.) was used as an alkali degreasing treatment agent to degrease the metal material at 40° C. for 2 minutes. The material was dipped and cleaned in a water-washing bath and then spray-washed with tap water for about 30 seconds.

Preparation of Metal Surface Treatment Composition

The metal surface treatment composition was prepared by way of using 40% zirconic acid as 500 ppm of zirconium based on metal element content, and KBE 903 (trade name, manufactured by Shin-Etsu Chemical Co.) in an effective component concentration of 20 ppm and 50 ppm of calcium nitrate as adhesive imparting agents. The pH was adjusted to 4.5. The surface treatment was conducted at 35° C. for 50 seconds.

Contact Step with Oxidizing Agent

Sodium nitrite solution of 250 ppm was brought into contact with the metal base material after surface treatment at room temperature for 30 seconds. Thereafter water washing was conducted.

Example 18

Metal Base Material

A commercially available cold-rolled steel (SPC, manufactured by Nippon Testpanel Co., 70 mm by 150 mm by 0.8 mm) was prepared for the metal base material.
Pretreatment of Metal Base Material Surf Cleaner EC92 (trade name, manufactured by Nippon Paint Co.) was used as an alkali degreasing treatment agent to decrease the metal material at 40° C. for 2 minutes. The material was dipped and cleaned in a water-washing bath and then spray-washed with tap water for about 30 seconds.
Preparation of Metal Surface Treatment Composition The metal surface treatment composition was prepared by way of using 40% zirconic acid as 50 ppm of zirconium based on metal element content, KBE 903 (trace name, manufactured by Shin-Etsu Chemical Co.) as the adhesive imparting agent in an effective component concentration of 50 ppm, aluminum nitrate In an amount of 500 ppm, and the concentration of fluorine ion was adjusted by adding hydrofluoric acid. The pH was adjusted to 3.5. The surface treatment was conducted at 35° C. for 60 seconds.
Contact Step with Agent for Stabilizing Fluorine Calcium nitrate solution of 250 ppm was brought into contact with the metal base material after surface treatment at room temperature for 30 seconds. Thereafter water washing was conducted.

Comparative Example 1

The metal base material was surface-treated in accordance with the method described in Example 1. The Zr/Si ratio was 20. Alkaline treatment was not conducted.

Comparative Example 2

The surface treatment composition was prepared in accordance with the method described in Example 1 and surface treatment was conducted under the same conditions as Example 1 except that no adhesive imparting agent was used. Alkaline treatment was not conducted.

Comparative Example 3

The surface treatment composition was prepared in accordance with the method described in Example 1 and surface treatment was conducted under the same conditions as Example 1, except that zirconium was used in an amount of 250 ppm based on metal element content, no adhesive imparting agent was used, 100 ppm of sodium nitrite was used as an additive. Alkaline treatment was not conducted.

Comparative Example 4

The surface treatment composition was prepared in accordance with the method described in Example 1 and surface treatment was conducted in the same manner as Example 1, except that PAA-10C (polyallylamine resin, trade name, manufactured by Nitta Boseki Co.) was used in an amount of 50 ppm as an adhesive imparting agent, and magnesium nitrate was used in an amount of 100 ppm as an additive. Alkaline treatment was not conducted.

Comparative Example 5

The surface treatment composition was prepared in accordance with the method described in Example 1 and surface treatment was conducted under the same conditions as Example 1, except that HIDA was used in an amount of 200 ppm as a uniformity improving agent and no adhesive imparting agent was used. Alkaline treatment was not conducted.

Comparative Example 6

Reference Example

Surface conditioning treatment was conducted at room temperature for 30 seconds using a zinc phosphate based surface treatment agent of Surffine GL1 (trade name, 0.3%, manufactured by Nippon Paint Co.) as a surface treatment accent. Secondly, surface treatment was conducted at 35° C. for 120 seconds using Surfdine 6350 (trade name, manufactured by Nippon Paint Co.). Pretreatment prior to the surface conditioning treatment was conducted in accordance with the method described in Example 1. Alkaline treatment was not conducted.
Evaluation Method
Uniformity The uniformity was evaluated in accordance with the "four-plate box method" described in Japanese Unexamined Patent Application, First Publication No. 2000-038525. That is, as shown in FIG. 1, the surface-treated metal materials of Examples 1 to 18 and Comparative Examples 1 to 6 were disposed such that four plates stood in parallel with a distance of 20 mm and lower portions of both sides and bottom faces were sealed with an insulating material such as fabric adhesive tape to prepare a box 10. In addition, through holes 5 of diameter 8 mm were provided at lower portions of the metal materials 1, 2 and 3 except for the metal material 4.

The box 10 was dipped into an electrodeposition coating container 20 filled with a cathodic electrodeposition coating material. In this case, the cathodic electrodeposition coating material flows into the box 10 only from each through hole 5.

While stirring the cathodic electrodeposition coating material with a magnetic stirrer, the metal materials 1 to 4 were electrically connected and a counter electrode 21 was disposed at a distance of 150 mm from the metal material 1. A voltage was applied to the metal materials 1 to 4 as a negative electrode and the counter electrode 21 as a positive electrode to conduct a cathodic electrodeposition coating. The coating was conducted in a way such that the voltage was increased for 5 seconds so as to form a coating film having a thickness of 20 μm on the A face of the metal material 1, followed by maintaining the voltage for 175 seconds. The bath temperature was adjusted to 30° C. at this time.

The coated metal materials 1 to 4 were water-washed and then baked at 170° C. for 25 minutes followed by air-cooling, thereafter, the film thickness of the coating film formed on the A face of the metal material 1 proximal to the counter electrode 21 and the film thickness of the coating film formed on the G face of the metal material 4 farthest from the counter electrode 21 were measured and the uniformity was evaluated on the basis of the ratio of film thickness (G face)/film thickness (A face). The larger the value, the uniformity can be evaluated to be more excellent. The results are shown in Table 1.

Observation of Sludge

Chemical conversion treatment was conducted in Examples and Comparative Examples, and turbidity (generation of sludge) in the chemical conversion treatment agents was visually compared after 30 days under room temperature to evaluate workability in accordance with the evaluation criteria below. The results are shown in Table 1.
- A: transparent liquid
- B: slightly dilute turbidity
- C: turbidity
- D: generation of deposit (sludge)

Film Amount

The test plates obtained in Examples and Comparative Examples were measured with respect to the amounts of Zr and Si in the chemical conversion films. Measurement was carried out by fluorescent X-ray analysis. The results are shown in Table 1.

Secondary Adhesive Test (SDT)

The test plates obtained in Examples and Comparative Examples were each provided with longitudinally parallel two cuts up to the base material and immersed into an aqueous solution of 5% NaCl at 50° C. for 480 hours. Thereafter water-washing and air-drying were conducted, then an adhesive tape of Ellpack LP-24 (trade name, manufactured by Nichiban Co.) was adhered to the cut portions and then the adhesive tape was rapidly peeled. The size of the largest width (one side) was measured for the coating material adhered to the peeled adhesive tape. A similar test was conducted for galvanized steel plates (GA) and aluminum plates (Al) which were surface-treated and electrode-position-coated. The results are shown in Table 1 (unit: mm).

TABLE 1

| | | Uniformity (%) | Sludge | Film Amount | | SDT(mm) | | |
|---|---|---|---|---|---|---|---|---|
| | | | | Zr | Si | SPC | GA | Al |
| Examples | 1 | 48% | B | 52 | 2.7 | 0 | 0 | 0 |
| | 2 | 49% | B | 51 | 2.8 | 0 | 0 | 0 |
| | 3 | 48% | B | 55 | — | 1.2 | 0 | 0 |
| | 4 | 47% | B | 44 | 4.3 | 0 | 0 | 0 |
| | 5 | 46% | B | 42 | 3.5 | 0 | 0 | 0 |
| | 6 | 49% | A | 51 | — | 0.8 | 0 | 0 |
| | 7 | 47% | A | 56 | 2.8 | 0 | 0 | 0 |
| | 8 | 47% | A | 54 | 7.2 | 0 | 0 | 0 |
| | 9 | 46% | B | 43 | — | 1.2 | 0 | 0 |
| | 10 | 50% | B | 44 | 2.6 | 0 | 0 | 0 |
| | 11 | 49% | B | 55 | — | 1 | 0 | 0 |
| | 12 | 51% | B | 52 | 2.6 | 0 | 0 | 0 |
| | 13 | 49% | B | 55 | 7 | 0 | 0 | 0 |
| | 14 | 49% | B | 45 | 7 | 0 | 0 | 0 |
| | 15 | 52% | B | 42 | 3.1 | 0 | 0 | 0 |
| | 16 | 48% | B | 51 | — | 1 | 0 | 0 |
| | 17 | 49% | B | 55 | 2.7 | 0 | 0 | 0 |
| | 18 | 51% | B | 34 | 2.6 | 0 | 0 | 0 |
| Comparative Examples | 1 | 13% | B | 52 | 2.7 | 0.2 | 0 | 0 |
| | 2 | 12% | B | 59 | — | 7.6 | 1.2 | 0 |
| | 3 | 13% | B | 62 | — | 5.9 | 0.8 | 0 |
| | 4 | 14% | B | 63 | — | 4.5 | 1 | 0 |
| | 5 | 38% | A | — | — | 10 | 3 | 0 |
| | 6 | 42% | D | — | — | 2.1 | 1.2 | 0 |

Cyclic Corrosion Test (CCT)

The test plates obtained in Examples and Comparative Examples were each tape-sealed at the edge and back face and introduced a cross-cut flaw (flaw up to metal) and then a CCT test was conducted under the conditions below.

That is, an aqueous solution of 5% NaCl maintained at 35° C. was continuously sprayed for 2 hours within a salt spray tester maintained at 35° C. and humidity 95%. Then the samples were dried for 4 hours under a humidity of 20% to 30% at 60° C. The swelled width (both sides) of coating film was measured after 200 cycles, in which one cycle corresponds to 3 times of the repeated procedures described above within 24 hours. A similar test was conducted for galvanized steel plates (GA) and high-tensile steel plates (HT) which had been surface-treated and electrodeposition-coated. The results are shown in Table 2 (unit: mm).

SST

5% NaCl solution was continuously sprayed at 35° C., and then swelled width (mm) was measured after 30 days and rust-generating condition was visually evaluated at edge portions. The results are show in Table 2.
- A: almost no rust
- B: generation of rusts in some spots
- C: generation of rusts in many spots Corrosion Resistance The test plates, obtained in Examples and Comparative Examples, were measured for resistance values of corrosion resistance in 5% NaCl solution using Potentiostat HZ-3000 (trade name, manufactured by Hokuto Denko Co.). The results are shown in Table 2.

Primary Wetting

The test plates, obtained in Examples and Comparative Examples, were left to stand in an atmosphere of temperature 50° C. and humidity 95% for one hour and then rust area was measured. The results are shown in Table 2.

TABLE 2

| | | CCT(mm) | | | SST | | Primary |
|---|---|---|---|---|---|---|---|
| | | SPC | HT | GA | mm | Edge | Wetting |
| Examples | 1 | 6.3 | | | | | 0% |
| | 2 | 6 | | | | | 0% |
| | 3 | 6.2 | | | | | 5% |
| | 4 | 5.8 | 7.3 | 5 | 2.8 | A | 0% |
| | 5 | 6.5 | | | | | 0% |
| | 6 | 6.3 | 7.1 | 4.8 | 3 | A | 0% |
| | 7 | 5.9 | 7.2 | 4.6 | 3 | A | 0% |
| | 8 | 5.8 | 6.9 | 5 | 2.9 | A | 0% |
| | 9 | 6.4 | | | | | 0% |
| | 10 | 6 | | | | | 0% |
| | 11 | 6.4 | | | | | 5% |
| | 12 | 6.1 | 7.5 | 4.8 | 3 | A | 0% |
| | 13 | 6.4 | 7.2 | 4.8 | 3 | A | 5% |
| | 14 | 5.8 | 6.9 | 5 | 2.9 | A | |
| | 15 | 6 | 7 | 5 | 3 | A | |
| | 16 | 6.2 | 6.9 | 5 | 3 | A | |
| | 17 | 6 | 7.3 | 5 | 2.9 | A | |
| | 18 | 6.1 | 7.2 | 5.1 | 3 | A | |
| Comparative Examples | 1 | 6.4 | 13.2 | 5 | 3.3 | B | 50% |
| | 2 | 10.1 | 16.8 | 5.5 | 4 | C | 50% |
| | 3 | 12.0 | 15.2 | 6 | 4.2 | C | 40% |
| | 4 | 10.2 | 17 | 5.5 | 4 | C | 40% |
| | 5 | 20.0 | 20 | 8.5 | 5 | C | 90% |
| | 6 | 11.5 | 8.9 | 5 | 3.5 | A | 20% |

The invention claimed is:

1. A surface treatment method for improving uniformity of a cathodic electrodeposition coating film, the method comprising the steps of:
   treating a surface of a metal base material to form a rust-resistant film by applying to the surface of the metal base material a treatment composition comprising at least one of zirconium ions or titanium ions;
at least one stabilizing agent selected from the group consisting of an amino acid compound, an aminocarboxylic acid compound, and a sulfonic acid compound; and
at least one adhesive imparting agent comprising an adhesive imparting resin comprising a polyamine compound having at least one constituent unit represented by the chemical formula

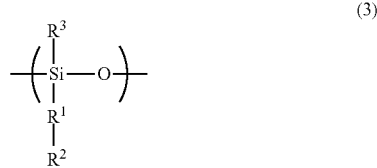

wherein in chemical formula (3), $R^1$ is an alkylene group having 1 to 6 carbon atoms, $R^2$ is a substituent group represented by one of the following chemical formulas (4) to (6), and $R^3$ is a hydroxyl group, an alkoxy group having 1 to 6 carbon atoms, or an alkyl group having 1 to 6 carbon atoms, and

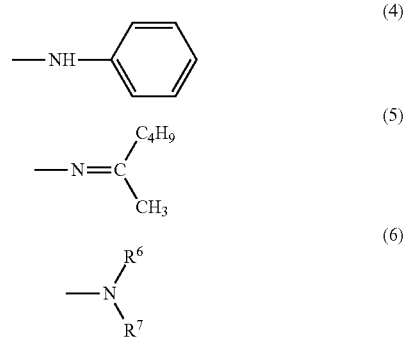

in chemical formula (6), $R^6$ is a hydrogen atom, an aminoalkyl group having 1 to 6 carbon atoms or an alkyl group having 1 to 6 carbon atoms, and $R^7$ is hydrogen atom or an aminoalkyl group having 1 to 6 carbon atoms;
at least one step selected from the group consisting of
(d) contacting all or a part of the metal base material with a first oxidizing agent selected from the group consisting of nitrous acid, sulfurous acid, persulfate, bromic acid, an iodine compound, chloric acid, $HMnO_4$, $HVO_3$, $H_2MoO_4$, $H_2WO_4$, hydrogen peroxide and salts thereof after the surface treatment step, and
(e) contacting all or a part of the metal base material with a second oxidizing agent selected from the group consisting of nitrous acid, sulfurous acid, persulfate, bromic acid, an iodine compound, chloric acid, $HMnO_4$, $HVO_3$, $H_2MoO_4$, $H_2WO_4$, hydrogen peroxide and salts thereof, and thereafter washing all or a part of the treated metal base material with water after the surface treatment step; and
electropainting the metal base material with a cathodic electrodeposition coating material consisting of an amine-modified epoxy resin, a curing agent, and a sealing agent.

2. The surface treatment method according to claim 1, wherein the treatment composition further comprises at least one polyvalent anion selected from the group consisting of phosphoric acid, phosphonic acid, lignin, tannic acid, a phenol compound, an amino acid, a polyacrylic acid, and a sugar.

3. The surface treatment method according to claim 1, wherein the adhesive imparting agent further comprises a silicon-containing compound selected from the group consisting of silica, silicofluoride, a soluble silicate compound, silicate esters, alkyl silicates, and a silane coupling agent.

4. The surface treatment method according to claim 3, wherein the silane coupling agent is at least one selected from the group consisting of an aminosilane having at least an amino group in a molecule, and a hydrolysis-polycondensate of the aminosilane, wherein
the treatment composition has a total amount of the zirconium and/or titanium ions of 10 ppm to 10,000 ppm based on metal element content,
the treatment composition has a total amount of the aminosilane and/or the hydrolysis-polycondensate of the aminosilane of 1 ppm to 2,000 ppm based on silicon element content, and
the treatment composition has a mass ratio of zirconium and/or titanium elements to silicon element contained in the aminosilane having at least an amino group in a molecule, the hydrolysis-polycondensate of the aminosilane, or both, of 0.5 to 500.

5. The surface treatment method according to claim 1, wherein the adhesive imparting agent further comprises an adhesive imparting metal ion that is at least one metal ion selected from the group consisting of magnesium, zinc, calcium, aluminum, gallium, indium, copper, iron, manganese, nickel, cobalt, silver, and tin.

6. The surface treatment method according to claim 1, wherein the adhesive imparting resin further comprises at least one member selected from the group consisting of a blocked isocyanate compound, and a melamine resin.

7. The surface treatment method according to claim 6, wherein the polyamine compound further comprises at least one constitutional unit represented by the chemical formulas (1), and/or (2) shown below, and
the treatment composition has a mass ratio of zirconium and/or titanium elements to polyamine compound of 0.1 to 100

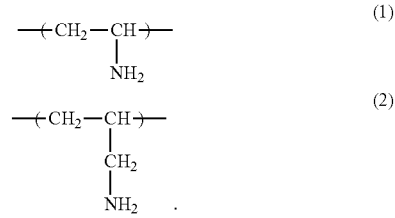

8. A surface treatment method according to claim 1, wherein the treatment composition has a pH of 1.5 to 6.5.

9. A metal material treated with the surface treatment method according to claim 1.

10. The surface treatment method according to claim 1, wherein the treatment composition further comprises at least one polyvalent anion selected from the group consisting of phosphoric acid, phosphonic acid, lignin, tannic acid, an amino acid, a polyacrylic acid, and a sugar.

11. A surface treatment method for improving uniformity of a cathodic electrodeposition coating film, the method comprising the steps of:

treating a surface of a metal base material to form a rust-resistant film by applying to the surface of the metal base material a treatment composition comprising at least one of zirconium ions or titanium ions; at least one stabilizing agent selected from the group consisting of an amino acid compound, an aminocarboxylic acid compound, and a sulfonic acid compound; and at least one adhesive imparting agent comprising an adhesive imparting resin comprising a polyamine compound having at least one constituent unit represented by the chemical formula

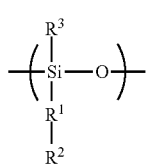

(3)

wherein in chemical formula (3), $R^1$ is an alkylene group having 1 to 6 carbon atoms, $R^2$ is a substituent group represented by one of the following chemical formulas (4) to (6), and $R^3$ is a hydroxyl group, an alkoxy group having 1 to 6 carbon atoms, or an alkyl group having 1 to 6 carbon atoms, and

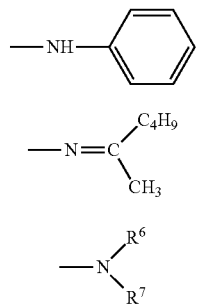

(4)

(5)

(6)

in chemical formula (6), $R^6$ is a hydrogen atom, an aminoalkyl group having 1 to 6 carbon atoms or an alkyl group having 1 to 6 carbon atoms, and IC is hydrogen atom or an aminoalkyl group having 1 to 6 carbon atoms;

contacting all or a part of the surface of the metal base material with an oxidizing agent selected from the group consisting of nitrous acid, sulfurous acid, persulfate, bromic acid, an iodine compound, chloric acid, $HMnO_4$, $HVO_3$, $H_2MoO_4$, $H_2WO_4$, hydrogen peroxide and salts thereof after the surface treatment step; and electropainting the metal base material with a cathodic electrodeposition coating material consisting of an amine-modified epoxy resin, a curing agent, and a sealing agent.

12. A surface treatment method for improving uniformity of a cathodic electrodeposition coating film, the method comprising the steps of:

treating a surface of a metal base material to form a rust-resistant film by applying to the surface of the metal base material a treatment composition comprising at least one of zirconium ions or titanium ions; at least one stabilizing agent selected from the group consisting of an amino acid compound, an aminocarboxylic acid compound, and a sulfonic acid compound; and at least one adhesive imparting agent comprising an adhesive imparting resin comprising a polyamine compound having at least one constituent unit represented by the chemical formula

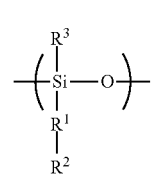

(3)

wherein in chemical formula (3), $R^1$ is an alkylene group having 1 to 6 carbon atoms, $R^2$ is a substituent group represented by one of the following chemical formulas (4) to (6), and $R^3$ is a hydroxyl group, an alkoxy group having 1 to 6 carbon atoms, or an alkyl group having 1 to 6 carbon atoms, and

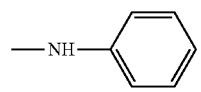

(4)

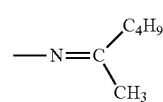

(5)

(6)

in chemical formula (6), $R^6$ is a hydrogen atom, an aminoalkyl group having 1 to 6 carbon atoms or an alkyl group having 1 to 6 carbon atoms, and $R^7$ is hydrogen atom or an aminoalkyl group having 1 to 6 carbon atoms;

contacting all or a part of the metal base material with an oxidizing agent selected from the group consisting of nitrous acid, sulfurous acid, persulfate, bromic acid, an iodine compound, chloric acid, $HMnO_4$, $HVO_3$, $H_2MoO_4$, $H_2WO_4$, hydrogen peroxide and salts thereof, and thereafter washing all or a part of the surface of the metal base material with water after the surface treatment step; and electropainting the metal base material with a cathodic electrodeposition coating material consisting of an amine-modified epoxy resin, a curing agent, and a sealing agent.

\* \* \* \* \*